United States Patent
Yamada et al.

(10) Patent No.: US 8,015,616 B2
(45) Date of Patent: *Sep. 6, 2011

(54) CONTENTS TRANSMISSION METHOD AND CONTENTS TRANSMISSION SYSTEM

(75) Inventors: Kazuhiro Yamada, Yokohama (JP); Nobuyuki Watanabe, Sayama (JP); Masayuki Tsuda, Tokyo (JP); Dai Kamiya, Ichikawa (JP); Mao Asai, Yokosuka (JP); Fumiaki Miura, Yokosuka (JP); Satoshi Washio, Tokyo (JP); Atsuki Tomioka, Yokohama (JP); Hiroshi Kawabata, Tokyo (JP); Takashi Kondo, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 12/394,671

(22) Filed: Feb. 27, 2009

(65) Prior Publication Data

US 2009/0199012 A1  Aug. 6, 2009

Related U.S. Application Data

(63) Continuation of application No. 10/500,885, filed as application No. PCT/JP03/00035 on Jan. 7, 2003, now Pat. No. 7,530,114.

(30) Foreign Application Priority Data

Jan. 8, 2002  (JP) ................................. 2002-001843

(51) Int. Cl.
    *H04N 7/16*  (2006.01)
(52) U.S. Cl. ............ 726/30; 713/157; 713/176; 726/10; 705/51
(58) Field of Classification Search .................... 726/10, 726/30; 713/157, 176; 705/51
    See application file for complete search history.

(56) References Cited

U.S. PATENT DOCUMENTS

| 5,673,315 A | 9/1997 | Wolf |
| 5,708,709 A | 1/1998 | Rose |
| 6,269,421 B1 | 7/2001 | Nishimura |
| 6,317,742 B1 | 11/2001 | Nagaratnam et al. |
| 6,345,288 B1 | 2/2002 | Reed et al. |
| 6,766,353 B1 | 7/2004 | Lin et al. |

(Continued)

FOREIGN PATENT DOCUMENTS

EP  0 813 132 A2  12/1997

(Continued)

OTHER PUBLICATIONS

Kaku, T. et al., "Introduction to Java Programming in i-mode, 1$^{st}$ Edition" *Nikkei Business Publications*, Inc., Mar. 26, 2001, pp. 37-41.

(Continued)

*Primary Examiner* — Eleni A Shiferaw
*Assistant Examiner* — Paul Callahan
(74) *Attorney, Agent, or Firm* — Brinks Hofer Gilson & Lione

(57) ABSTRACT

Mobile unit 16 which can activate Java-AP software receives SDF (Security Descriptive File) 204 from administering server unit 18 which a trustworthy organization (a communication provider which administers mobile packet communication network 15) administers, and obtains ADF 205 from IP server unit 13 by using URL contained in the SDF, and obtains Jar file 206 from IP server unit 13 by using ADF 205, and installs in itself Java-AP containing these files. Java-AP, which is achieved by activating the installed Java-AP software, operates within the range of authorization expressed by policy information contained in SDF 204.

13 Claims, 15 Drawing Sheets

U.S. PATENT DOCUMENTS

| | | | |
|---|---|---|---|
| 6,971,016 | B1 | 11/2005 | Barnett |
| 6,976,165 | B1 | 12/2005 | Carpentier et al. |
| 7,530,114 | B2 | 5/2009 | Yamada et al. ............... 726/30 |
| 2002/0073072 | A1 | 6/2002 | Fukumoto |
| 2003/0061487 | A1 | 3/2003 | Angelo et al. |
| 2004/0230949 | A1 | 11/2004 | Talwar et al. ............... 717/118 |
| 2005/0005099 | A1 | 1/2005 | Naruse et al. |
| 2005/0160045 | A1 | 7/2005 | Watanabe et al. |
| 2009/0165130 | A1 | 6/2009 | Yamada et al. ............... 726/21 |

FOREIGN PATENT DOCUMENTS

| | | |
|---|---|---|
| EP | 1 033 652 A2 | 9/2000 |
| EP | 1 132 796 | 12/2001 |
| EP | 1 289 326 A1 | 3/2003 |
| EP | 1 326 396 A2 | 7/2003 |
| JP | 10-83310 A | 3/1998 |
| JP | 10-91427 A | 4/1998 |
| JP | 11-205767 A | 7/1999 |
| JP | 2001-117769 A | 4/2001 |
| JP | 2001-216043 A | 8/2001 |
| JP | 2001-243062 A | 9/2001 |
| JP | A-2001-298774 | 10/2001 |
| JP | 2003-050641 A | 2/2003 |
| WO | WO 98/21683 A2 | 5/1998 |
| WO | WO 00/42498 A1 | 7/2000 |

OTHER PUBLICATIONS

"i Appli Service & 503i Series" *Business Communication*, vol. 38, No. 2, Feb. 1, 2001, pp. 44-47.

Jaworski, J., "Java 2 Security Programming" Java Security Handbook, 1st Edition, Apr. 25, 2001, pp. 79-90, 529-541.

Office Action issued Aug. 28, 2007 in Japanese Patent Application No. 2002-001843.

Kawaguchi, "Practically Useful Homepages vol. 30", Nikkei PC21, Nikkei Business Publication, Inc., Jun. 1, 2000, vol. 5, No. 11 pp. 150-154.

Edited by ASCII Shoseki Henshubu "i-Mode Java Programming—Stand Alone Application Part revised new edition" ASCII Coup., May 21, 2001, total 17 pages.

Li, G. "Java Series Java2 Platform Security", *Kabushiki Kaisha Pearson Education*, First Edition, Nov. 30, 2000, total 14 pages.

Computer Today, No. 87, Sep. 1, 1998, total 9 pages.

Translation of International Preliminary Examination Report issued Oct. 6, 2003 in International Application No. PCT/JP03/03974.

Megler, V., "i-mode From bandwidth problem into Internet phenomenon", *Developerworks*, Feb. 2002, XP002329582, 13 Pages.

Sun Microsystems, Inc., "Default Policy Implementation and Policy File Syntax", *Java Sun*, Oct. 30, 1998, XP002329583, 11 Pages.

NTT DoCoMo, "i-mode Java Content Developer's Guide—Functional Descriptions-", Release 1.1, May 14, 2000 total 12 pages.

Jess Garms, "Professional Java Security", Publishing House of Electronics Industry, Jan. 31, 2002 total 35 pages.

Li Gong, "Java2 Platform Security", Japan, Pearson Education, Inc., Nov. 30, 2000, 1st edition, pp. 41-44 and 123-138 (ISBN: 4-89471-193-1).

ASCII Book Editorial Department, "i mode Java programming—Standalone Applications: Newly-Revised Edition", Japan, ASCII Corporation, May 21, 2001, 1st Edition, pp. 19, 20 and 40-52 (ISBN: 4-7561-3790-3).

Schneier, "Applied Cryptography, Protocols, Algorithms and Source Code in C", 2nd edition, 1996 ISBN: 0471128457, p. 38.

Stalling, "Cryptography and network security", 2nd edition, 1998, ISBN: 0138690170 in view of Angelo (USPUB 2003/0061487), pp. 243-254.

Feghhi, et al., "Digital Certificates Applied Internet Security", 1999, ISBN: 0201309807, pp. 6189.

Chinese Office Action dated May 12, 2006 in Chinese patent application No. 03807636.5.

Chinese Office Action dated Dec. 1, 2006 in Chinese patent application No. 03807636.5.

Japanese Office Action issued Mar. 13, 2007 in Japanese Patent Application No. 2003-096088.

Japanese Office Action issued Oct. 16, 2007 in Japanese Patent Application No. 2003-581004.

Japanese Office Action issued Jul. 22, 2008 in Japanese Patent Application No. 2002-001843.

Supplementary European Search Report issued Nov. 12, 2008 in European Application No. 03715596.7, 5 pages.

Japanese Office Action dated Apr. 20, 2010, issued in Japanese Patent Application No. 2007280585 3 pages.

Non-Final Office Action mailed Oct. 5, 2007, issued in U.S. Appl. No. 10/500,885, 12 pages.

Response After Non-Final Action filed Jan. 31, 2008, in U.S. Appl. No. 10/500,885, 9 pages.

Final Rejection mailed Apr. 15, 2008, issued in U.S. Appl. No. 10/500,885, 11 pages.

Amendment After Final Rejection filed Jul. 16, 2008, in U.S. Appl. No. 10/500,885, 7 pages.

Non-Final Rejection mailed Jul. 31, 2008, issued in U.S. Appl. No. 10/500,885, 6 pages.

Response After Non-Final Action filed Oct. 2, 2008, in U.S. Appl. No. 10/500,885, 7 pages.

Notice of Allowance mailed Dec. 30, 2008, issued in U.S. Appl. No. 10/500,885, 7 pages.

Applicants' Response to Examiner's Reasons for Allowance filed Mar. 27, 2009, in U.S. Appl. No. 10/500,885, 1 page.

Non-Final Office Action mailed Jul. 20, 2011, issued in U.S. Appl. No. 12/394,724 (16 pages.).

FIG. 6

| APID | POLICY INFORMATION | ADF-URL | PUBLIC KEY |
|---|---|---|---|
|  |  |  |  |

FIG. 7

| TRUSTED API | PERMISSION |
|---|---|
| getPhoneList() | ○ |
| getCallHistory() | × |
| getMsStatus() | ○ |
|  |  |

```
<OBJECT declare id="application.declaration"
data="http://www.ccc.co.jp/horoscope.jam>
TSUME-SHOGI
</OBJECT>
SOFTWARE FOR ~.CLICK
<A ijam="#application.declaration">HERE</A>
TO DOWNLOAD.
```

```
<OBJECT declare id="application.declaration"
data="http://www.ccc.co.jp/viewer.jam>
HOROSCOPE
</OBJECT>
SOFTWARE FOR ~. CLICK
<A ijam="#application.declaration">HERE</A>
TO DOWNLOAD.
```

\<OBJECT declare id="application.declaration"
data="http://www.aaa.co.jp/abc.sdf"
type="application/x-jam"\>
TELEPHONE DIRECTORY VIEWER
\</OBJECT\>
SOFTWARE FOR ~. CLICK
\<A ijam="#application.declaration"\>HERE\</A\>
TO DOWNLOAD.

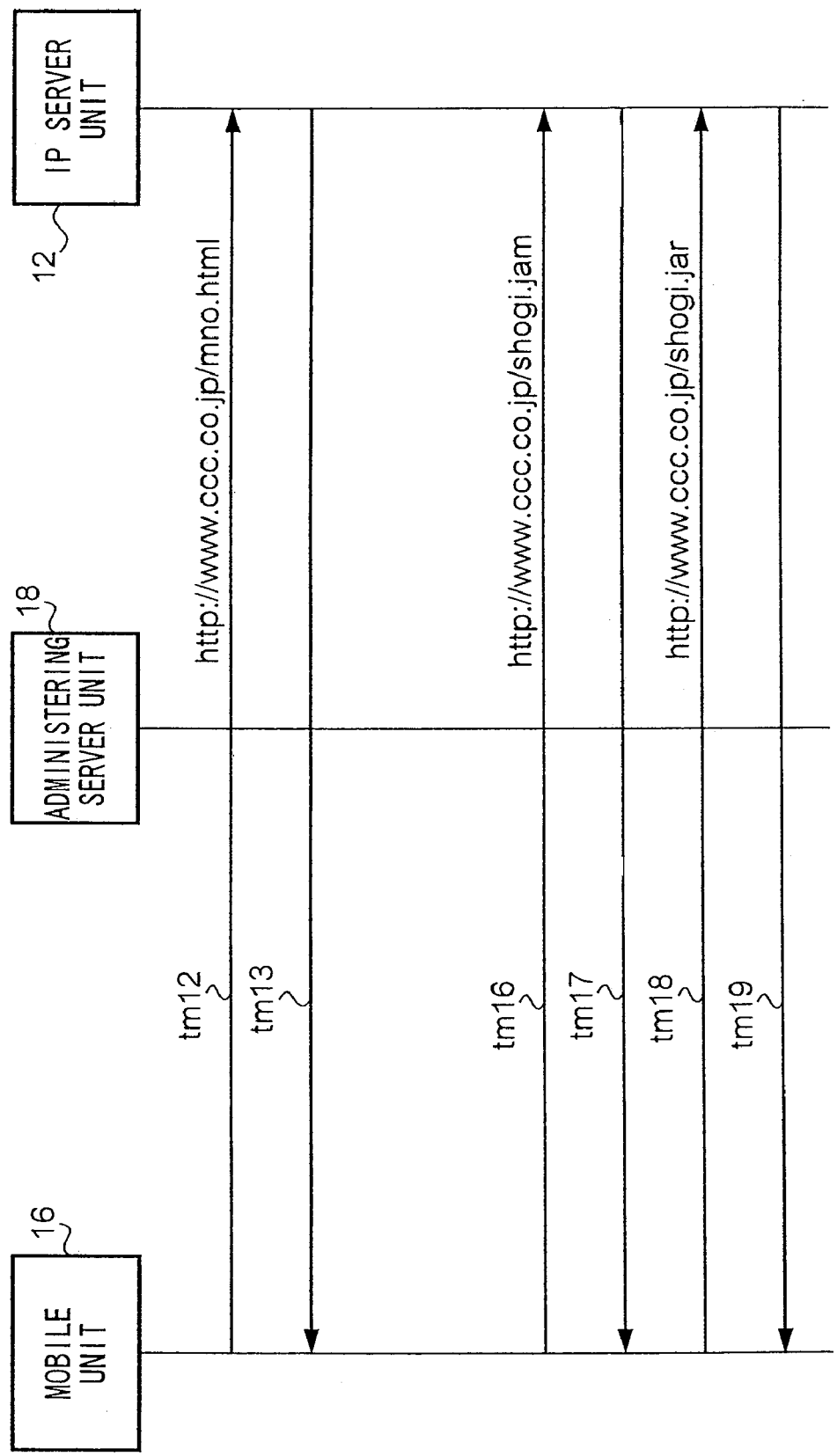

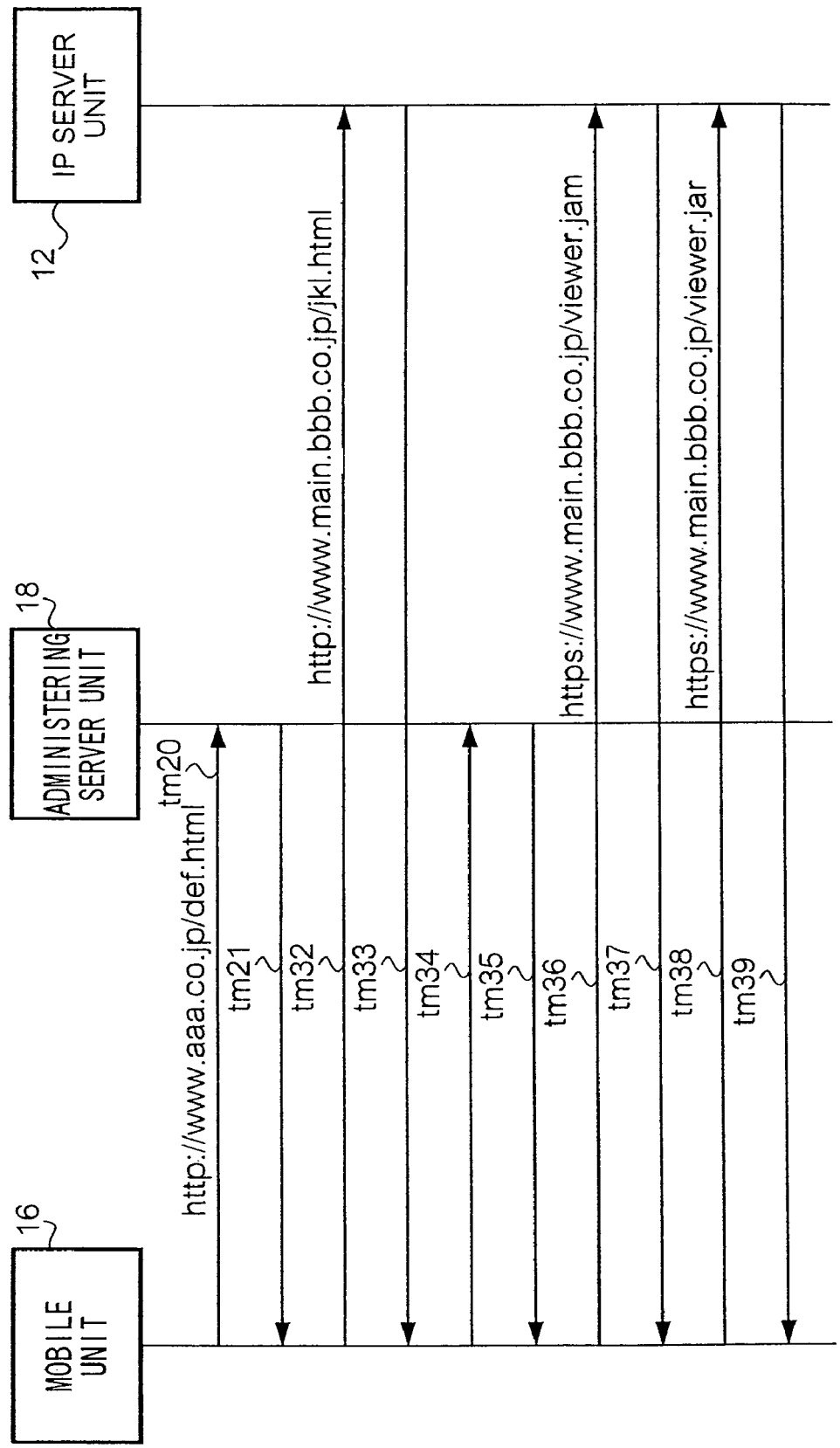

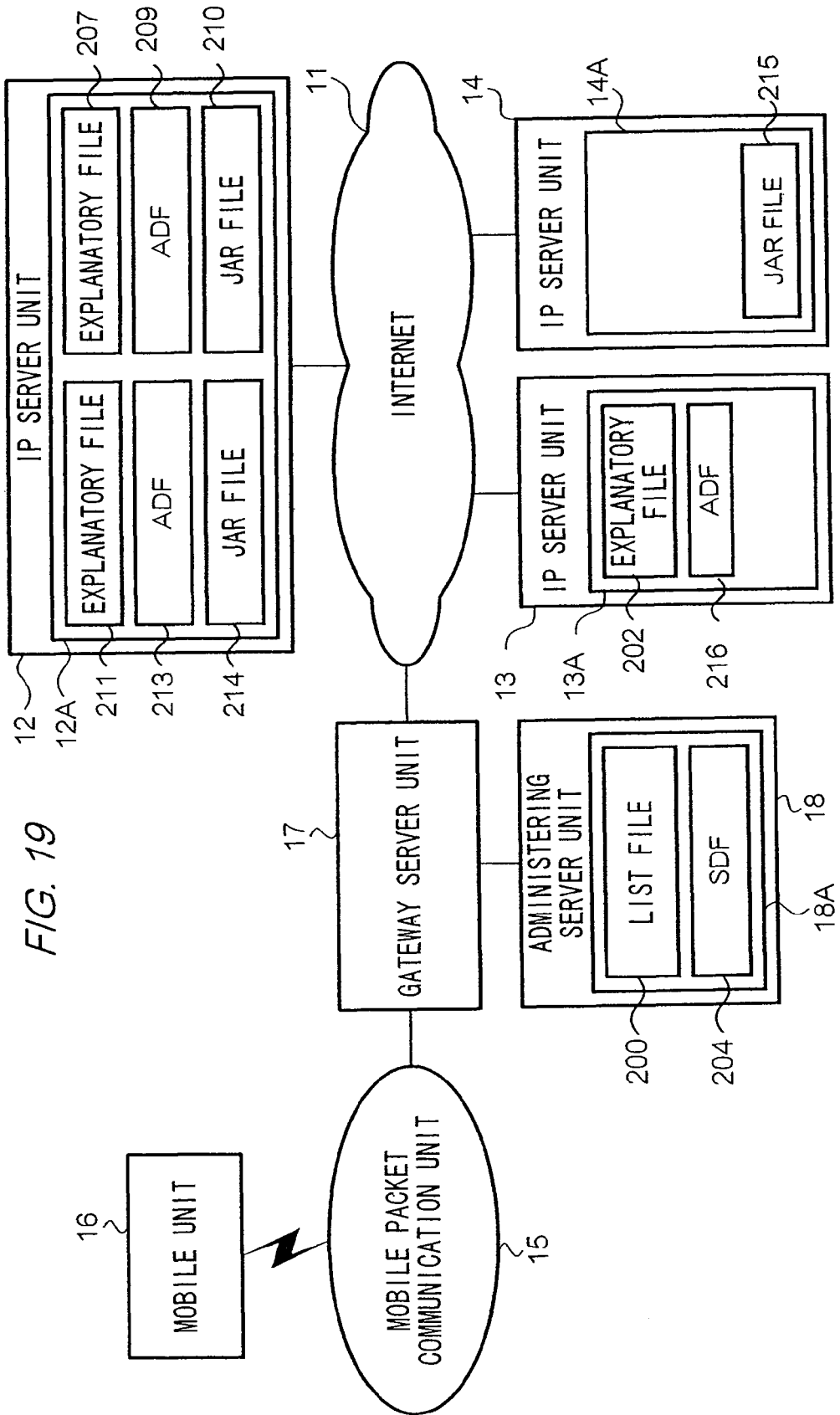

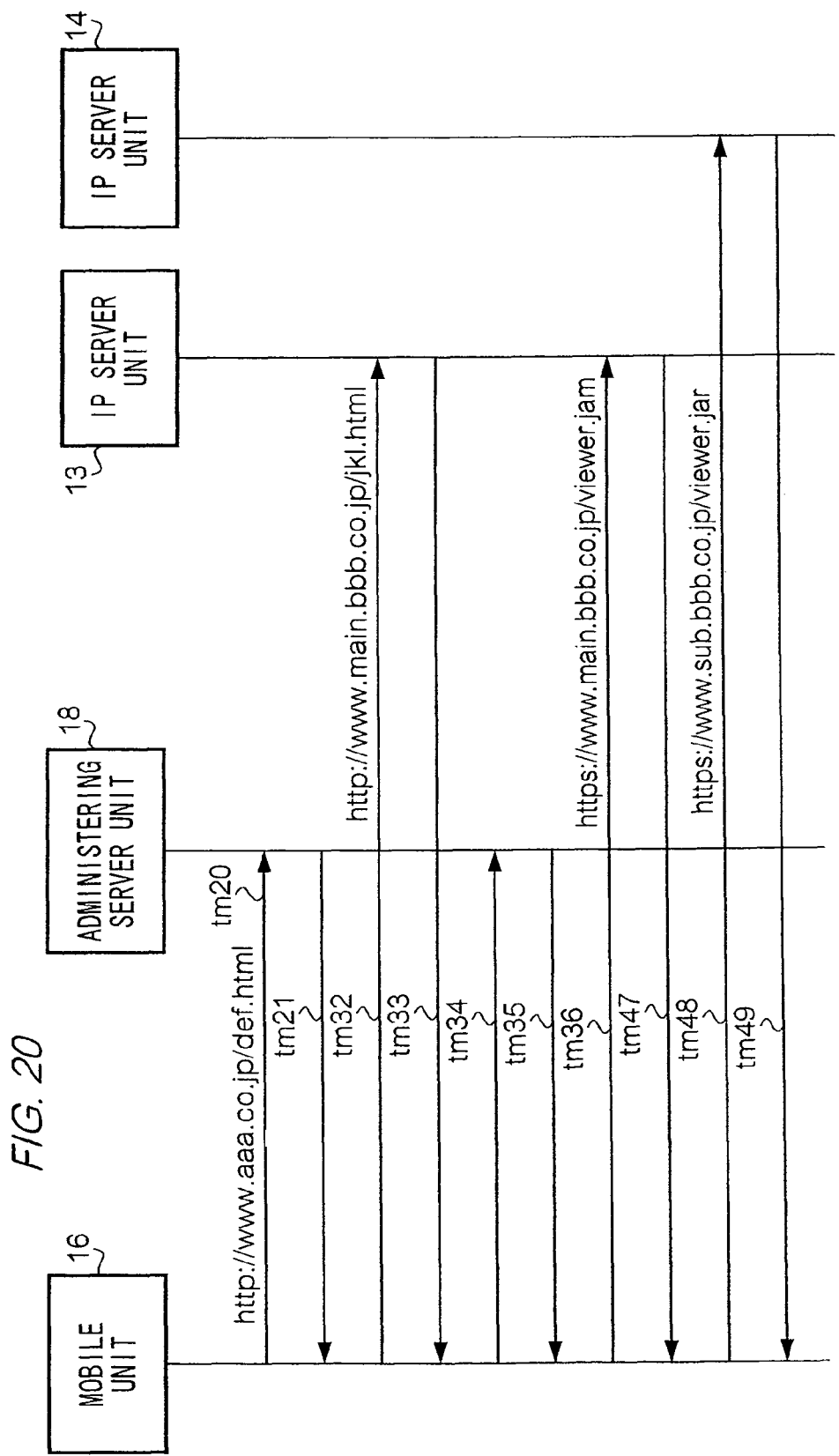

CONTENTS TRANSMISSION METHOD AND CONTENTS TRANSMISSION SYSTEM

REFERENCE TO RELATED APPLICATIONS

This application is a continuation of U.S. patent application Ser. No. 10/500,885 filed on Jul. 7, 2004, now U.S. Pat. No. 7,530,114, which is a national phase application of PCT Application No. PCT/JP03/00035 filed Jan. 7, 2003, which claims priority to Japanese Patent Application No. 2002-001843. U.S. patent application Ser. No. 10/500,885 is hereby incorporated by reference herein in its entirety.

TECHNICAL FIELD

The present invention relates to transmitting application software to terminal units.

BACKGROUND ART

Mobile units equipped with a function of executing Java-AP (Java Application) software by carrying out a program written in accordance with Java (trademark registered) programming language, and downloaded via a network are in widespread use.

Java-AP software includes a Jar (Java Archive) file and an ADF (Application Descriptor File). The Jar file contains a program, which provides a user with certain Java-AP. The ADF is dependent upon the Jar file, and contains, for instance, URL showing where a Jar file is stored (hereinafter, referred to as package URL), the size of a Jar file, the most recent date when a Jar file is changed and other necessary information.

A mobile unit downloads the relevant software to the desired Java-AP by following the process described below. First, the mobile unit obtains an ADF pertaining to the desired Java-AP from a server unit, which constitutes WWW (World Wide Web).

The mobile unit, which obtains an ADF checks the content of the ADF, and determines whether the Jar file pertaining to the desired Java-AP can be installed in the mobile unit. When the mobile unit determines that Java-AP software can be installed, the mobile unit obtains from a server unit, which constitutes WWW a Jar file by using package URL contained in the ADF. The process of downloading Java-AP software is complete when the Jar file is obtained. Hereinafter, in the mobile unit, installation of the downloaded Java-AP software is carried out, and the Java-AP software can be activated when required.

Incidentally, when the Java-AP software is installed in a mobile unit the activation of Java-AP is subject to greater restriction than the activation of functions that are native to the mobile unit, such as a communication application function. The activation of a Java-AP is restricted in that it is unable to access certain data contained in a mobile unit, such as telephone numbers for example. By imposing strict restrictions in this manner, leakage or falsification of confidential data contained in a mobile unit, occurring due to malfunctioning Java-AP or caused intentionally, can be prevented.

However, imposing the above-mentioned restriction on all Java-AP uniformly does not adequately meet the needs of a user of a mobile unit or an IP (information provider). For instance, some users seem to feel that Java-AP could be allowed to refer to some of the private information stored in a mobile unit as long as security is guaranteed. Also, some IPs wish to provide Java-AP, which uses some of the private information stored in a mobile unit, or some of the functions a mobile unit is equipped with.

To fulfill these requirements, a system in which a trustworthy organization such as a communication provider providing a communication service to users of mobile units working as an authority, is entrusted with the responsibility of authorizing Java-AP to operate with greater flexibility. Mobile units using Java-AP are notified by the authorization of the operational rules set for Java-AP, and the mobile units can restrict the operation of Java-AP on the basis of the prescribed rules. In this system, only a trustworthy organization should be entrusted to administer the authorization of a more flexible operation of Java-AP.

When the above-mentioned system is applied to the downloading process of Java-AP software, information showing the authorization in an ADF or a Jar file must be included. Since a Jar file is updated by an IP as required, and it is appropriate for an IP to own a Jar file, it is appropriate for the corresponding ADF to contain information on the validity of the authorization.

However, since the content of an ADF is dependent upon a Jar file, an ADF owned by a trustworthy organization needs to be updated once an IP updates a Jar file. Also, updating an ADF becomes necessary at times even without the updating of a Jar file, as in the instance where access to a certain Jar file gets deluged, and the Jar file is moved to another server unit in the IP. In this instance, since the location where the Jar file is stored is changed, a package URL contained in the ADF needs to be changed. However, since the ADF is administered by a trustworthy organization and excludes the involvement of other agents, the updating operation of an ADF could become a very busy one.

DISCLOSURE OF INVENTION

The present invention was developed to overcome the stated problems of the conventional art, and its object is to provide a transmission method and a transmission system for transmitting without restricting the freedom of an IP to a terminal unit which allows an application to operate in accordance with an authorization, software for achieving an application which is transmitted by transmitting a plurality of files which are dependent upon each other.

To solve the above-mentioned problem of the conventional art, the present invention provides a transmission method comprising: a process for transmitting an authorization file in a communication system in which an originator originates a request including information showing a storage of a file and the file is transmitted in response to the request, the process for transmitting including transmitting a security descriptive file as the authorization file from an administering server unit storing the security descriptive file through a secure link to a terminal unit, the security descriptive file containing first identification information and authorization information, the first identification information showing a storage location of an application descriptive file, the application descriptive file having information dependent upon an entity file, which includes software for executing an application, along with information showing a storage location of the entity file, the authorization information of the security descriptive file indicating an allowable range of an operation of the application which is executed in accordance with the software, the terminal unit executing operation of the application within a range shown by the authorization information; a dependent information obtaining process for the terminal unit to obtain, by using the first identification information contained in the security descriptive file transmitted from the communication system in the authorization transmission process, the application descriptive file from one or a plurality of server units in which the application descriptive file is stored; and a program obtaining process for the terminal unit to obtain the entity file from the communication system by using the application descriptive file obtained in the dependent information obtaining process.

By this transmission method, the terminal unit obtains before obtaining the application descriptive file and the entity file corresponding to the application, the security descriptive file, which is transmitted by the communication system after security has been assured. In the security descriptive file, the authorization given to the application is denoted, and in the terminal unit, the application corresponding to the security descriptive file is allowed to operate in accordance with the authorization denoted by the obtained security descriptive file.

Also, the present invention provides a transmission system comprising: a communication system for returning, when a stored location of a file is notified, the file which comprises one or a plurality of server units in which an entity file containing software for achieving an application and an application descriptive file which has a content dependent upon the entity file showing a stored location of the entity file, and an administering server unit in which a security descriptive file containing a first identification information showing a stored location of the application descriptive file and authorization information showing authorization given to an application which is achieved when a terminal unit executes the software is stored; and a terminal unit which approves operation of an application in accordance with authorization given to the application, wherein the administering server unit transmits the security descriptive file to the terminal unit by assuring security, and wherein the terminal unit obtains the application descriptive file by using the first identification information contained in the security descriptive file transmitted by the communication system, and the entity file from the communication system by using the application descriptive file.

By this transmission system, the terminal unit, before obtaining the application descriptive file and the entity file corresponding to the application, obtains the security descriptive file transmitted by the transmission system after security has been assured. The authorization given to the application is denoted in the security descriptive file, and in the terminal unit, the application corresponding to the security descriptive file is allowed to operate in accordance with the permission of the authorization denoted by the obtained security descriptive file.

BRIEF DESCRIPTION OF THE DRAWINGS

FIG. 6 is a conceptual figure showing data configuration of an SDF stored in administering server unit 18 in the transmission system.

FIG. 7 is a conceptual figure showing the content of policy information contained in the SDF.

FIG. 16 is a sequence diagram for explaining the operation of the transmission system.

FIG. 17 is a sequence diagram for explaining the operation of the transmission system.

FIG. 18 is a sequence diagram for explaining the operation of the transmission system.

FIG. 19 is a block diagram for explaining another operation of the transmission system.

FIG. 20 is a sequence diagram for explaining another operation of the transmission system.

PREFERRED EMBODIMENTS FOR CARRYING OUT THE INVENTION

Hereinafter, by referring to figures, a transmission system, which is one mode of the present invention is explained. In figures, identical codes are given to common portions.

(1) Configuration

Figure 1:
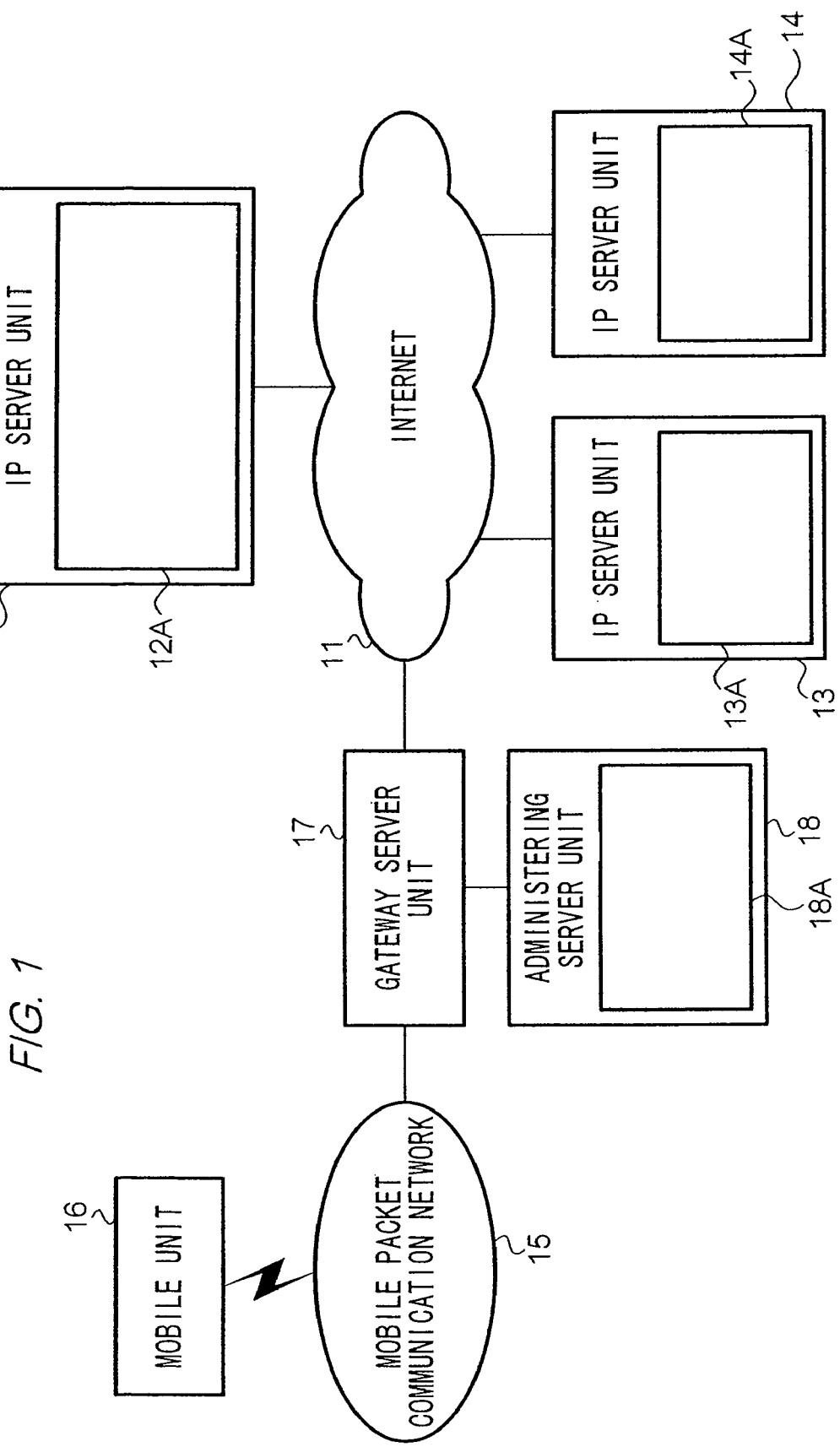
FIG. 1 is a block diagram showing the configuration of the transmission system of one embodiment for executing the present invention.

As shown in FIG. 1, in the transmission system, IP server units 12 to 14 are connected to Internet 11. IP server unit 12 is administered by the first IP (Internet Provider), and IP server units 13 and 14 are administered by the second IP, which differs from the first IP. IP server units 12 to 14 constitute WWW, and each is equipped with similar hardware and functions to those of a general WWW server unit. Mobile packet communication network 15 is a network a communication provider uses to provide a mobile packet communication service. Mobile unit 16 can perform radio packet communication with mobile packet communication network 15. Gateway server unit 17 is administered by an identical communication provider to that of mobile packet communication network 15. Gateway server unit 17 is a unit for connecting mobile packet communication network 15 and Internet 11, and has similar configuration to that of a general gateway server unit. Administering server unit 18 is connected to gateway server unit 17 by an exclusive line. Administering server unit 18 also constitutes WWW, and has similar hardware and a function to those of a general WWW unit. Gateway server unit 17 performs packet communication between mobile packet communication network 15 and Internet 11, packet communication between administering server unit 18 and mobile packet communication network 15, and packet communication between administering server unit 18 and Internet 11. Mobile unit 16, by using the relaying function, is able to perform packet communication with IP server units 12 to 14 via mobile packet communication network 15 and Internet 11. Several mobile units exist in the actual transmission system, but only one mobile unit 16 is shown to avoid complicating the figures. For the same reason, only IP server units 12 to 14 are shown.

In the transmission system, mobile unit 16 is capable of receiving Java-AP software from the desired site on Internet 11. Software which mobile unit 16 is capable of receiving is distinguished between the one pertaining to a trusted Java-AP and the one pertaining to a non-trusted Java-AP. A trusted Java-AP software is one which the communication provider administering mobile packet communication network 15 guarantees authenticity of on the basis of the contract with IP administering IP server units 12 to 14. A non-trusted Java-AP software is any Java-AP software other than a trusted Java-AP software.

Administering server unit 18 stores each SDF (Security Descriptive File) pertaining to each trusted Java-AP software, which is transmitted in the transmission system. SDF is a file, which is produced by the communication provider administering mobile packet communication network 15, and is the file necessary for downloading into a mobile unit the Java-AP software, which uses trusted API (APplication Interface) of the mobile unit. An explanation of trusted API will follow later. As shown in FIG. 6, an SDF contains an APID for detecting trusted Java-AP software, policy information, ADF-URL showing the location where an ADF corresponding to the Java-AP software is stored, and public key CA (Certifying Agent) gives to IP which provides the Java-AP software. Policy information is the information showing restriction on the operation of Java-AP. Policy information and the restriction on Java-AP's operation carried out on the basis of the policy information will be explained in detail afterwards.

In the present embodiment, when a trusted Java-AP software is transmitted to mobile unit 16 by one of IP server units 12 to 14, an SDF corresponding to the trusted Java-AP software is transmitted to mobile unit 16 by administering server unit 18 in response to the request from mobile unit 16. In mobile unit 16, when a trusted Java-AP software is executed, restriction on the trusted Java-AP's operation is carried out on the basis of the SDF corresponding to the trusted Java-AP. This is one characteristic of the present embodiment. As shown in FIG. 1, transmission of the SDF is carried out via mobile packet communication network 15, and administering server unit 18 and gateway server unit 17 are connected by an exclusive line. Also, for transmission, the SDF is encrypted.

Hereinafter, with regard to relevance to the characteristics, the configuration of each element of the transmission system will be explained.

IP server units 12, 13 and 14 are equipped with fixed memory 12A, 13A and 14A respectively.

Fixed memory 12A, 13A and 14A are fixed memories such as a hard disc, and store Java-AP software constituting Jar files and ADF, and explanatory files on the content of Java-AP software for users of mobile units.

Figure 2:
FIG. 2 is a conceptual figure showing data configuration of an ADF inherent to the transmission system.

Each Java-AP software stored in fixed memory 12A, 13A and 14A might be either trusted Java-AP software or non-trusted Java AP software. Whether Java-AP is a trusted Java-AP or a non-trusted Java-AP, in each ADF of Java-AP software, information such as a package URL showing the location where a Jar file in WWW is stored, information showing the size of the Jar file, and information showing the date of the most recent update are written. Such information is generally known as items to be written in the ADF of a Java-AP software. Also, the ADF of a trusted Java-AP software, as shown in FIG. 2, contains an APID of the trusted Java-AP and the hash value of the Jar file besides the generally known information. Furthermore, the ADF of a trusted Java-AP software is encrypted by a secret key which CA gives to an IP which provides the software.

Also, the explanatory file is a text file written in accordance with HTML. A mobile unit, when a certain Java-AP software is downloaded, needs to download beforehand the explanatory file corresponding to the Java-AP software. The explanatory file contains information for forming UI (User Interface) for receiving from the user the command for downloading Java-AP software. Mobile unit 16 displays the UI screen in accordance with the information. The user can carry out the operation on mobile unit 16 for specifying the object showing the desired Java-AP on the UI screen. The explanatory file is written for the object specified by the user in this manner so as to correspond to the URL showing where in WWW the SDF (ADF if SDF does not exist) corresponding to Java-AP software which is the object for downloading is located.

Each of IP server units 12 to 14 is equipped with the function of producing and updating each of the above-mentioned files in accordance with the command of an IP.

Administering server unit 18 is equipped with fixed memory 18A such as a hard disc. Administering server unit 18 establishes a TCP connection with the party. When administering server unit 18 receives a request message which uses the GET method of HTTP from the party via a TCP connection, administering server unit 18 reads out the file identified by the URL specified by the GET method from fixed memory 18A, and returns a response message of HTTP containing the file, and severs the connection.

Also, in the above-mentioned fixed memory 18A are stored, list file 200 for introducing to the user of mobile unit 16 downloadable Java-AP software, and respective SDF corresponding to each Java-AP software which is listed in list file 200.

List file 200, as SDF, is the file produced by the communication provider in accordance with the contract signed by each IP which administers IP server units 12 to 14, and the communication provider which administers administering server unit 18. List file 200 is a text file written in accordance with HTML. As already explained, the mobile unit needs to obtain the explanatory file containing a URL of an SDF to download the SDF of certain Java-AP software. Mobile unit 16 can obtain the explanatory file directly by accessing the IP server unit in which the explanatory file is stored. However, in the present embodiment, mobile unit 16 can obtain the explanatory file of the desired Java-AP software also by the following process as opposed to the above-mentioned direct method. First, mobile unit 16, by accessing administering server unit 18, obtains list file 200, and displays the UI screen accordingly. The user can carry out the operation on mobile unit 16 to specify the object showing the desired Java-AP on the UI screen. List file 200 matches the object specified by the user to a URL showing the location of the explanatory file of Java-AP software in WWW which is the object of downloading. Mobile unit 16, by using the URL obtained via list file 200, obtains the explanatory file from the IP server unit.

Figure 3:
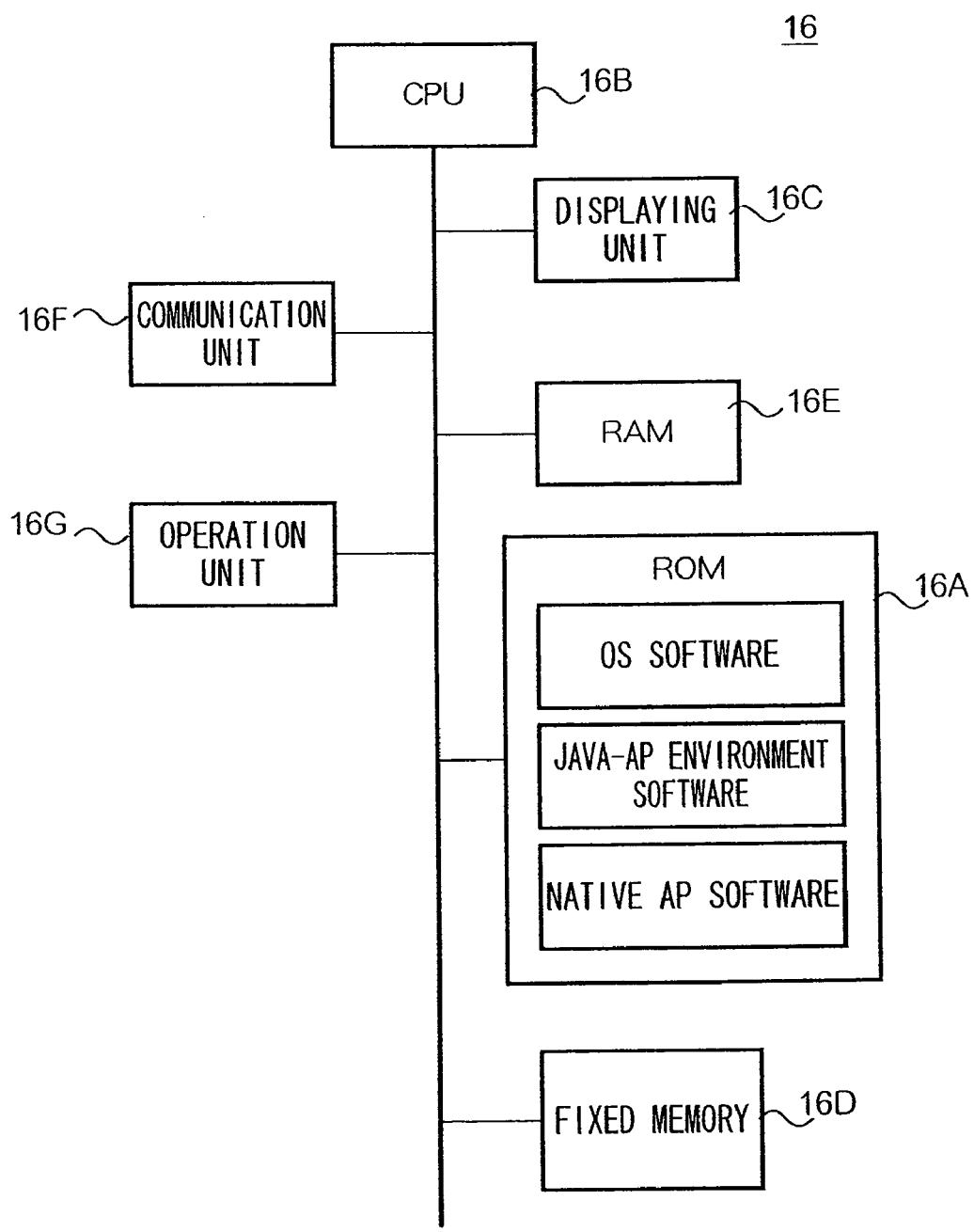
FIG. 3 is a block diagram showing the configuration of mobile unit 16 constituting the transmission system.

Mobile unit 16 consists of, as shown in FIG. 3, OS (Operating System) software; ROM 16A in which Java-AP environment software for establishing the environment for executing the Java-AP, and several types of native AP software are stored; CPU 16B which is connected to ROM 16A for reading out a program from ROM 16A and executing the program; displaying unit 16C which is connected to CPU 16B; fixed memory 16D; RAM 16E; communication unit 16F; and operation unit 16G.

Displaying unit 16C has, for instance, a liquid crystal displaying panel, and displays data provided by CPU 16B as an image. Fixed memory 16D is, for instance, SRAM or EEPROM, and data is read and written by CPU 16B. Fixed memory 16D is used to store Java-AP software (ADF and Jar)

downloaded from a server unit (hereinafter, referred to as a Web server unit) constituting WWW, and an SDF.

Communication unit 16F performs radio packet communication with mobile packet communication network 15, and relays packets between CPU 16B and mobile packet communication network 15. Also, communication unit 16F is equipped with CODEC, a microphone, a speaker and so forth for communication besides an antenna or a radio transmission and reception unit. Hence, mobile unit 16, by communication unit 16F, can perform communication by circuit switching via a mobile communication network (not shown). Operation unit 16G is equipped with an operation controller, and provides CPU 16B a signal in accordance with the operation carried out by the operation controller.

Figure 4:
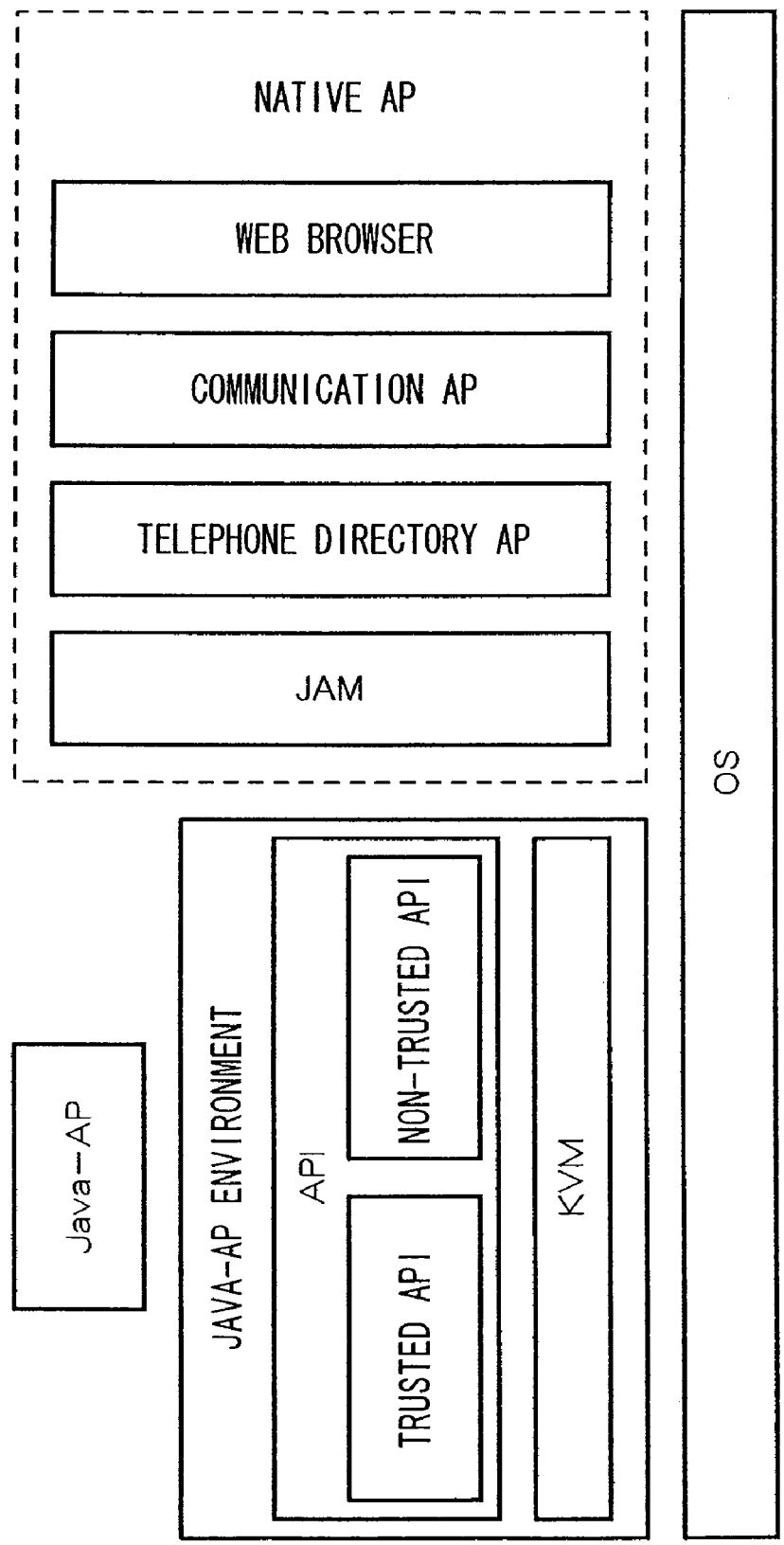
FIG. 4 is a conceptual figure showing the functional configuration of mobile unit 16.

As the switch (not shown) is turned on, CPU 16B reads out the program contained in OS software from ROM 16A, and executes with RAM 16E as a work area. As a result, functions for providing UI and so forth are executed in CPU 16B. In other words, CPU 16B activates OS software, and executes OS of FIG. 4 in mobile unit 16. OS identifies the command of the user on the basis of the signal provided by operation unit 16G and the status of UI, and executes the process in accordance with the command.

When the command of the user requests activation of communication software, which is native AP software, OS activates the communication software, and executes communication AP in mobile unit 16. By using communication AP, the user can communicate with the party.

When the command of the user requests the activation of telephone directory AP, which is native AP software, OS activates the telephone directory software, and executes telephone directory AP in mobile unit 16. By using telephone directory AP, the user can refer to, use, and change the content of the telephone directory (hereinafter, referred to as telephone directory data) stored in fixed memory 16D.

When the command of the user requests the activation of Web browser software, which is native AP software, OS activates Web browser software, and executes the Web browser in mobile unit 16. Also, the Web browser provides UI. Then, as the user gives the command by operating operation unit 16G, the Web browser identifies the command of the user on the basis of the status of UI and the signal provided by operation unit 16G, and executes the process in accordance with the command. For instance, when the command is for obtaining the specified file from WWW, a TCP connection is established by operating communication unit 16F with the Web server unit in which the file is stored, a request message of HTTP using the GET method is transmitted by URL showing the specified location, a response message corresponding to the request message is received, and the connection is severed. Furthermore, the Web browser interprets the file contained in the received response message in accordance with HTML, produces UI containing the Web page, and provides the user. Also, when a user sends a command for downloading Java-AP software, the command is notified to JAM (Java Application Manager). Specifically, in a Web page, either by clicking or pressing, when an anchor tag to which the object tag is specified is designated, the Web browser extracts URL which is specified as data property of the object tag, and notifies JAM that downloading of Java-AP software by URL is requested.

When the command of the user requests the activation of JAM software, which is native AP software, OS activates JAM software, and executes JAM in mobile unit 16. JAM shows to the user a list of Java-AP software installed in mobile unit 16, and activates the Java-AP software specified by the user. Specifically, when the command of the user to JAM requests the activation of Java-AP software, Java-AP environment software is activated, and Java-AP environment is executed in mobile unit 16. Then, the specified Java-AP software is activated, and Java-AP is executed in Java-AP environment. Java-AP environment contains KVM, which is a lightweight Java Virtual Machine appropriate to a cellular terminal, and API provided for Java-AP. API provided for Java-AP is divided into trusted API which only Java-AP whose trustworthiness is guaranteed by the communication provider on the basis of the contract with the IP (hereinafter, referred to as trusted AP) is allowed to use, and non-trusted API which any Java-AP is allowed to use.

(2) Operation

Figure 5:
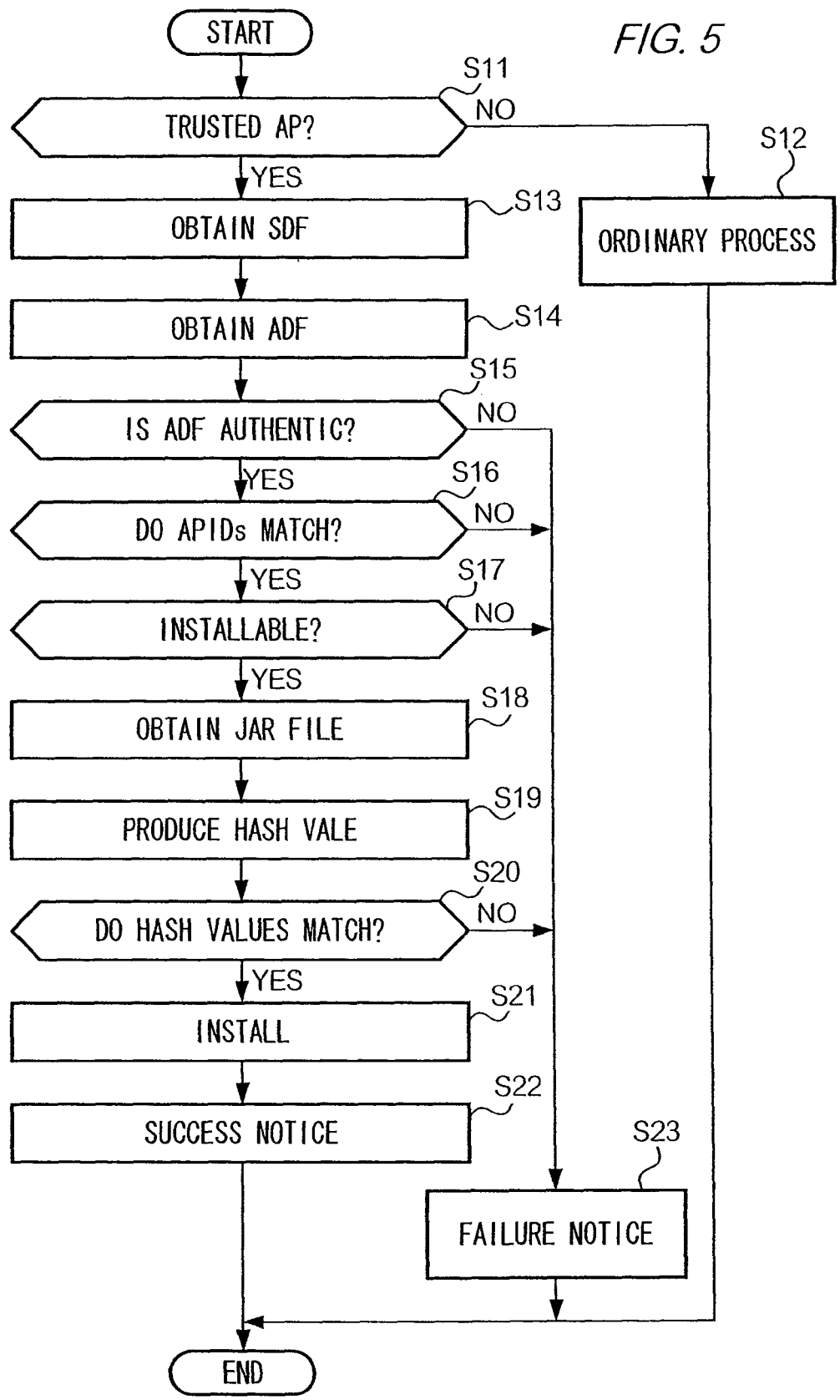
FIG. 5 is a flowchart showing the process of mobile unit 16 for downloading and installing Java-AP software.

Hereinafter, the operation of the present embodiment is explained. JAM, when a command for requesting the downloading of Java-AP is notified by the Web browser, carries out the process for downloading and installing Java-AP software into mobile unit 16. The flow of the process is shown in FIG. 5. In FIG. 5, the process of mobile unit 16 for obtaining the explanatory file is omitted. Since some different modes exist for the process of obtaining the explanatory file, the process will be later explained with some specific examples of the operation. As shown in FIG. 5, JAM first determines whether Java-AP software, which is about to be downloaded, is trusted Java-AP software (Step S11). Specifically, when mobile unit 16 obtains the explanatory file, the Web browser provides the user UI corresponding to the explanatory file, and receives the command for downloading Java-AP software from the user. The Web browser notifies JAM of URL of the Java-AP software specified by the user. JAM refers to the file name at the end of the URL notified by the Web browser, and determines that the software is trusted Java-AP software if the extension of the file is "sdf", and non-trusted Java-AP software if the extension of the file is not "sdf." When the Java-AP software, which is about to be downloaded, is determined as trusted Java-AP software, the downloading and installation processes identical to the conventional processes are carried out (Step S12).

When the Java-AP software, which is about to be downloaded, is determined as trusted Java-AP software, JAM obtains the SDF corresponding to the software from administering server unit 18 (Step S13). In other words, JAM establishes the TCP connection with administering server unit 18, produces and transmits via the TCP connection a request message requesting administering server unit 18 for transmission of the SDF stored in the location shown by URL notified by the Web browser, receives the response message to the request message, and severs the above-mentioned connection.

Then, JAM extracts APID, ADF-URL, and the public key from SDF contained in the response message, and writes SDF into fixed memory 16D. Next, JAM obtains ADF (Step S14). Specifically, JAM establishes the TCP connection with the Web server unit in which ADF identified by ADF-URL extracted from SDF is stored, produces and transmits a request message for requesting transmission of ADF, receives a response message to the request message, and severs the TCP connection.

As already explained, an ADF corresponding to trusted Java-AP software, contains the hash values of an APID and a Jar file, and further signed (encrypted) by the secret key CA gives to the IP which provides the trusted Java-AP software. Then, JAM checks (decodes) the signature of the ADF contained in the response message by using the public key extracted from the SDF, and determines the authenticity of the ADF (Step S15).

When an ADF is determined to be authentic, the JAM compares the APID extracted from an SDF to an APID contained in the ADF, and determines whether these APIDs match (Step S16). When these APIDs are determined to match, JAM determines whether the trusted Java-AP software can be installed in mobile unit 16 on the basis of the content of the ADF (Step S17). The basis of determination is identical to the conventional basis.

When installation is determined to be possible, JAM obtains the Jar file. Specifically, JAM writes the ADF into mobile unit 16, and extracts the hash value and package URL from the ADF. Furthermore, JAM establishes the TCP connection with the Web server unit in which the Jar file identified by package URL is stored, produces and transmits a request message for requesting transmission of the Jar file, receives the response message to the request message, and severs the TCP connection (Step S18).

Furthermore, JAM calculates the hash value to the obtained Jar file (Step S19). Any hash function can be used to calculate the hash value, but the hash value used by the mobile unit and the hash value the IP uses for calculating the hash value contained in the ADF must be identical.

JAM compares the hash value calculated by JAM to the hash value extracted from the ADF (Step S20), writes the obtained Jar file into administering server unit 18 when these hash values match, carries out several kinds of processes pertaining to installation of trusted Java-AP software (Step S21), and notifies the user that installation is successful (Step S22).

When an ADF is determined not to be authentic, when an APID of an SDF and an APID of an ADF do not match, when the Java-AP software which is about to be installed is determined not to be installable, and when the calculated hash value and the hash value of an ADF do not match, the JAM notifies the user that installation has failed, and returns the status of mobile unit 16 to the status that exists before the acquisition of the SDF starts.

Also, JAM supervises the operation of Java-AP, and restricts the use of the trusted API. The restriction is carried out in accordance with policy information in SDF stored in fixed memory 16D. Policy information in SDF, for instance, is the content conceptually shown in FIG. 7. In the policy information shown in FIG. 7, the use of the necessary trusted API "getPhoneList( )" for referring to telephone number directory data, and the necessary trusted API "getMsStatus ( )" for obtaining the status of the mobile unit stored in the mobile unit are allowed, and the use of the necessary trusted API for referring to history data of transmission and reception "getCallHistory( )" stored in the mobile unit is forbidden.

(3) Specific Operation

Next, the operation of the above-mentioned system is explained.

In the operation explained below, establishment of the TCP connection and severing operation are general operations of HTTP; therefore, the explanation is omitted. Also, the above-mentioned operations carried out by OS, the Web browser, JAM, Java-AP, native AP and so forth are operations of mobile unit 16; therefore, in the following explanation, the main unit which carries out the operation is mobile unit 16.

Figure 8:
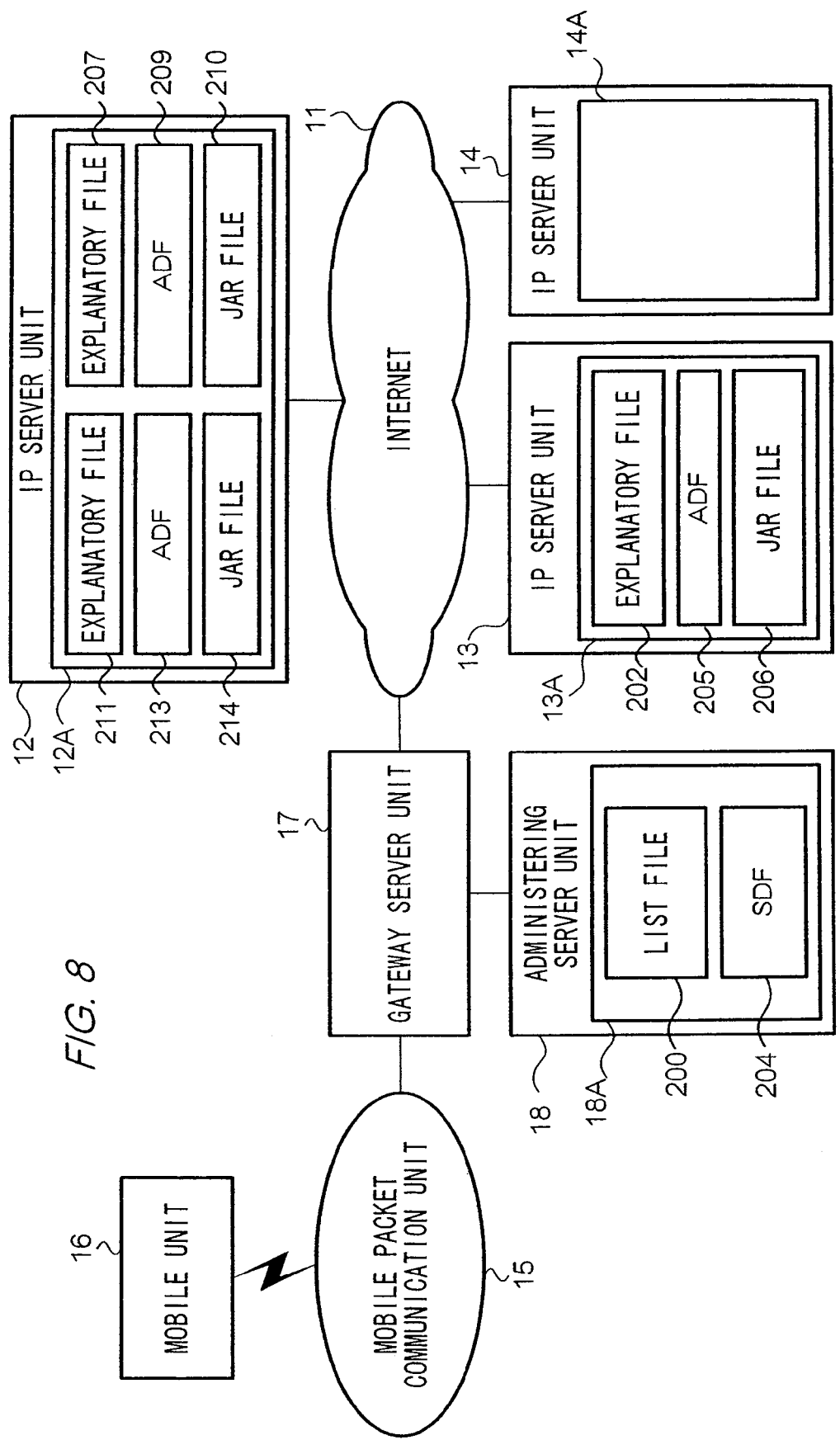
FIG. 8 is a block diagram for explaining the operation of the transmission system.

In the operation explained hereinafter, the following case is the presupposition. First, as shown in FIG. 8, in fixed memory 18A of administering server unit 18, are stored list file 200 and SDF 204. At this stage, list file 200 is written to provide list page 201 shown in FIG. 9 when interpreted and executed by mobile unit 16. Also, list file 200 is written, when option 201A constituting list page 201 is specified either by being clicked or pressed, to produce a request message containing URL of explanatory file 202 ("http://www.main.bbb.co.jp/ghi.html") as a parameter of the GET method. Moreover, list file 200 is written, when option 201B constituting list page 201 is specified, to produce a request message containing URL of explanatory file 207 ("http://www.ccc.co.jp/jkl.html") as a parameter of the GET method.

Also, SDF 204 contains "0001" as APID, information shown in FIG. 7 as policy information, "http://www.main.bbb.co.jp/viewer.jam" as ADF-URL, and public key CA gives to IP which administers IP server unit 13 and IP server unit 14.

Figures 9, 10:
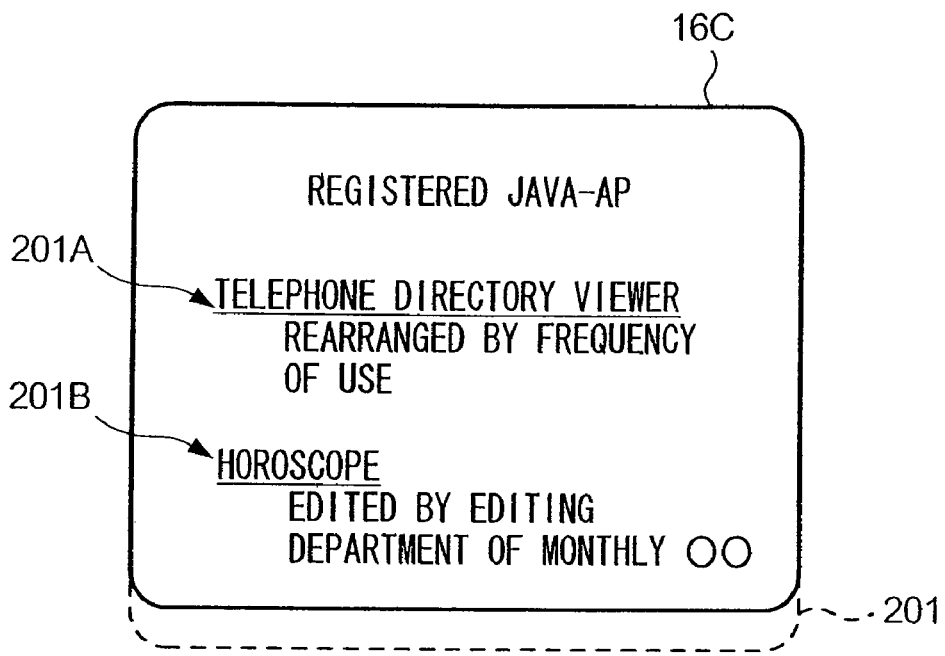
FIG. 9 is a diagram showing a list page transmitted in the transmission system.
FIG. 10 is a diagram showing the content of an explanatory file stored in IP server unit 12 constituting the transmission system.

Also, in fixed memory 12A of IP server unit 12, are stored explanatory file 211 corresponding to Java-AP software of the title "tsume-shogi" (a game similar to "chess") (hereinafter, referred to as the first Java-JP software), ADF 213, and Jar file 214. Explanatory file 211, ADF 213, and Jar file 214 are produced by IP administering IP server unit 12. The content of explanatory file 211 is shown in FIG. 10. Explanatory file 211 is written to provide explanatory page 212 shown in FIG. 11 when interpreted and executed by mobile unit 16. Also, ADF 213 contains URL of Jar file 214 ("http://www.ccc.co.jp/shogi.jar") as package URL.

Figures 11, 12:
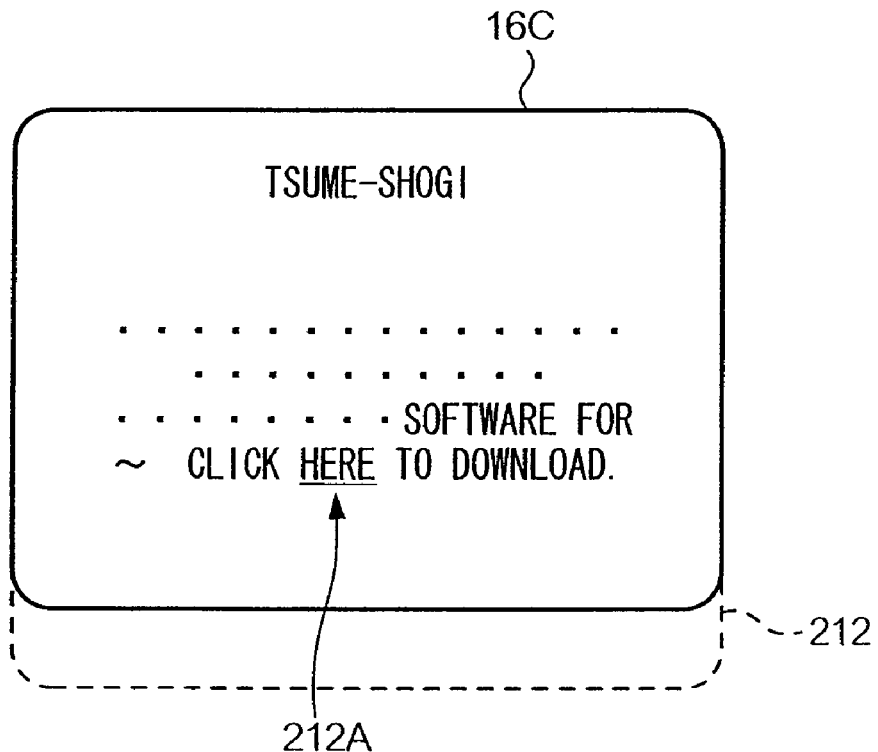
FIG. 11 is a diagram showing an explanatory page transmitted in the transmission system.
FIG. 12 is a diagram showing the content of an explanatory file stored in IP server unit 12.

Also, in fixed memory 12A of IP server unit 12, are stored explanatory file 207 corresponding to Java-AP software of the title "horoscope" (hereinafter, referred to as the second Java-AP software), ADF 209, and Jar file 210. Explanatory file 207, ADF 209, and Jar file 210 are produced by IP administering IP server unit 12. The content of explanatory file 207 is shown in FIG. 12. Explanatory file 207 is written to provide explanatory page 208 shown in FIG. 13 when interpreted and executed by mobile unit 16. Also, ADF 209 contains URL of Jar file 210 ("http://www.ccc.co.jp/horoscope.jar") as package URL.

Figures 13, 14:
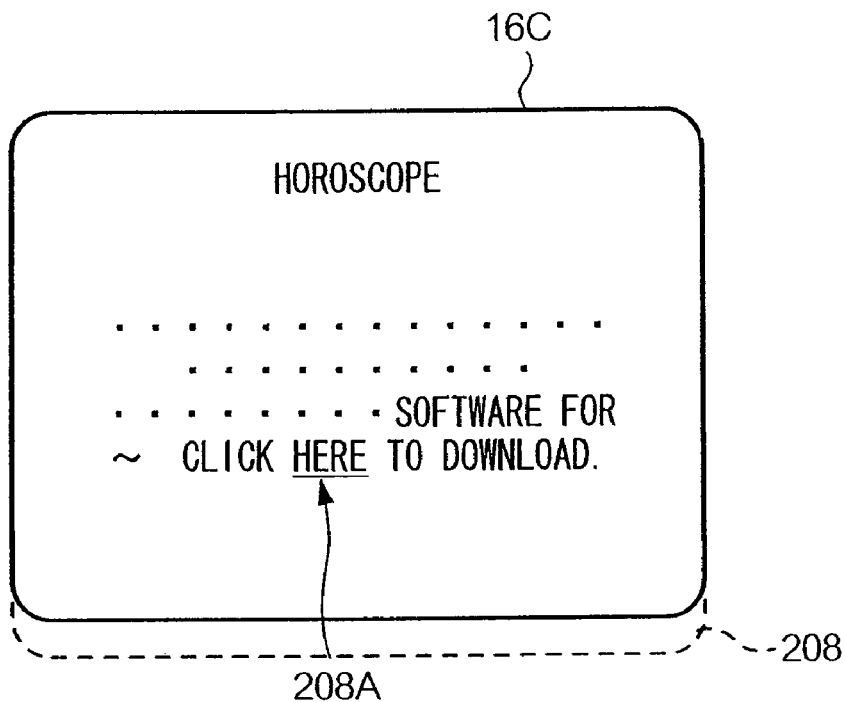
FIG. 13 is a diagram showing an explanatory page transmitted in the transmission system.
FIG. 14 is a diagram showing the content of an explanatory file stored in IP server unit 13 constituting the transmission system.

Also, in fixed memory 13A of IP server unit 13, are stored explanatory file 202 corresponding to Java-AP software of the title "telephone number directory viewer" (hereinafter, referred to as the third Java-AP software), ADF 205, and Jar file 206. Explanatory file 202, ADF 205, and Jar file 206 are produced by IP administering IP server unit 13 and IP server unit 14. The content of explanatory file 202 is shown in FIG. 14. Explanatory file 202 is written to provide explanatory page 203 shown in FIG. 15 when interpreted and executed by mobile unit 16. ADF 205 contains "0001" as APID, the hash value of Jar file 206, URL of Jar file 206 ("http://www.main.bbb.co.jp/viewer.jar") as package URL, and is signed by secret key CA gives to IP administering IP server unit 13, and IP server unit 14.

Also, mobile unit 16 is in the status in which the first to the third Java-AP software can be downloaded.

(2-1) Installation Operation

First, the operation of installing Java-AP software in mobile unit 16 is explained with reference to each Java-AP software.

(2-1-1) First Java-AP Software

The installation operation of the first Java-AP software begins when the user finds the IP server unit in which Java-software he/she desires is stored, and then tries to obtain explanatory file 211 in the Web browser by operating mobile unit 16. First, in mobile unit 16, request message tm 12 containing URL of explanatory file 211 ("http://www.ccc.co.jp/mno.html") as a parameter of the GET method is produced. Request message tm 12 is, as shown in FIG. 16, transmitted by mobile unit 16, and is received by IP server unit 12. In IP server unit 12, response message tm 13 containing explanatory file 211 is produced in response to the content of request message tm 12. Response message tm 13 is transmitted by IP server unit 12, and is received by mobile unit 16.

In mobile unit 16, UI corresponding to the content of explanatory file 211 is provided to the user. As a result, in displaying unit 16C, explanatory page 212 shown, for instance, in FIG. 11 is displayed.

When the user sees explanatory page 212, and operates mobile unit 16 to hit anchor 212A in explanatory page 212, the value specified as ijam property of the anchor tag written in explanatory file 211 of FIG. 10 (the tag which begins with "<A") identifies the object tag specified as id property (the tag which begins with "<OBJECT") in mobile unit 16. Then, URL specified as data property of the object tag ("http://www.ccc.co.jp/shogi.jam") is extracted, and determination of Step S11 of FIG. 5 is carried out. In the present example, since the extension of URL is not sdf, the ordinary process (Step S12) is carried out. In other words, the process is carried out as follows. First, request message tm 16 for requesting transmission of ADF 213 identified by the URL is produced. Request message tm 16 is transmitted by mobile unit 16, and is received by IP server unit 12. In IP server unit 12, response message tm 17 containing ADF 213 is produced in response to the content of request message tm 16. Response message tm 17 is transmitted by IP server unit 12, and is received by mobile unit 16.

In mobile unit 16, on the basis of the content of ADF 213, whether the first Java-AP software can be installed is determined. As mentioned above, since mobile unit 16 is in the status in which the first Java-AP software can be installed, installation of the first Java-AP software is determined to be possible in mobile unit 16.

Then, in mobile unit 16, ADF 213 is written into fixed memory 16D1. Also, in mobile unit 16, package URL ("http://www.ccc.co.jp/shogi.jar") is extracted from ADF 213, and request message tm 18 requesting transmission of Jar file 214 identified by the package URL is produced. Request message tm 18 is transmitted by mobile unit 16, and is received by IP server unit 12. In IP server unit 12, response message tm 19 containing Jar file 214 is produced in response to the content of request message tm 18. Response message tm 19 is transmitted by IP server unit 12, and is received by mobile unit 16. In mobile unit 16, Jar file 214 is written into fixed memory 16D1, and installation of the first Java-AP software is completed.

When the first Java-AP software is determined as not installable in mobile unit 16, the status of mobile unit 16 returns to the status that existed before the acquisition of ADF 213 began.

(2-1-2) Second Java-AP Software

The installation operation of the second Java-AP software begins when the user tries to obtain explanatory file 207 by operating mobile unit 16. As already explained, explanatory file 207 can be obtained either by directly accessing the relevant IP server or through list file 200, but only the operation which begins with trying to obtain list file 200 is explained.

As shown in FIG. 17, in mobile unit 16, request message tm 20 containing URL of list file 200 ("http://www.aaa.co.jp/def.html") as a parameter of the GET method is produced. Request message tm 20 is transmitted by mobile unit 16, and is received by administering server unit 18. In administering server unit 18, response message tm 21 containing list file 200 is produced in response to the content of request message tm 20. Response message tm 21 is transmitted by administering server unit 18, and is received by mobile unit 16. In mobile unit 16, when response message tm 21 is received, list file 200 in response message tm 21 is interpreted in accordance with HTML, and UI corresponding to the content of list file 200 is provided to the user of mobile unit 16. As a result, in displaying unit 16C of mobile unit 16, list page 201 shown, for instance, in FIG. 9 is displayed.

When the user, after seeing list page 201, operates mobile unit 16 to hit option 201B in list page 201, request message tm 22 containing URL ("http://www.ccc.co.jp/jkl.html") corresponding to option 201B as a parameter of the GET method is produced. Request message tm 22 is transmitted by mobile unit 16, and is received by IP server unit 12. In IP server unit 12, response message tm 23 containing explanatory file 207 is produced in response to the content of request message tm 22. Response message tm 23 is transmitted by IP server unit 12, and is received by mobile unit 16. In mobile unit 16, UI corresponding to the content of explanatory file 207 is provided to the user. As a result, in displaying unit 16C, explanatory page 208 shown, for instance, in FIG. 13 is displayed.

When the user, after seeing explanatory page 208, operates mobile unit 16 to hit anchor 208A in explanatory page 208, the value specified as ijam property of the anchor tag written in explanatory file 207 of FIG. 12 (the tag which begins with "<A") identifies the object tag specified as id property (the tag which begins with "<OBJECT"). Then, URL specified as data property of the object tag ("http://www.ccc.co.jp/horoscope.jam") is extracted, and determination of Step S11 of FIG. 5 is carried out. In this example, since the extension of URL is not sdf, an ordinary process (Step S12) is carried out. In other words, the process is carried out as follows. First, request message tm 26 requesting transmission of ADF 209 identified by the URL is produced. Request message tm 26 is transmitted by mobile unit 16, and is received by IP server unit 12. In IP server unit 12, response message tm 27 containing ADF 209 corresponding to the content of request message tm 26 is produced. Response message tm 27 is transmitted by IP server unit 12, and is received by mobile unit 16.

In mobile unit 16, on the basis of the content of ADF 209, whether the second Java-AP software can be installed is determined. As mentioned above, since mobile unit 16 is in the status in which the second Java-AP software can be installed, the second Java-AP software is determined as installable in mobile unit 16.

Next, in mobile unit 16, ADF 209 is written into fixed memory 16D1. Also, in mobile unit 16, package URL ("http://www.ccc.co.jp/horoscope.jar") is extracted from ADF 209, and request message tm 28 requesting transmission of jar file 210 identified by package URL is produced. Request message tm 28 is transmitted by mobile unit 16, and is received by IP server unit 12. In IP server unit 12, response message tm 29 containing Jar file 210 in response to the content of request message tm 28 is produced. Response message tm 29 is transmitted by IP server unit 12, and is received by mobile unit 16. In mobile unit 16, Jar file 210 is written into fixed memory 16D1, and installation of the second Java-AP software is completed.

When the second Java-AP software is determined as not installable in mobile unit 16, the status of mobile unit 16 returns to a previous status, that which existed before the acquisition of ADF 209 began.

(2-1-3) Third Java-AP Software

The installation operation of the third Java-AP software begins when the user tries to obtain explanatory file 202 by operating mobile unit 16. In the operation, mobile unit 16 obtains relevant list file 200, determines where explanatory file 202 exists, and tries to obtain explanatory file 202.

Figure 15:
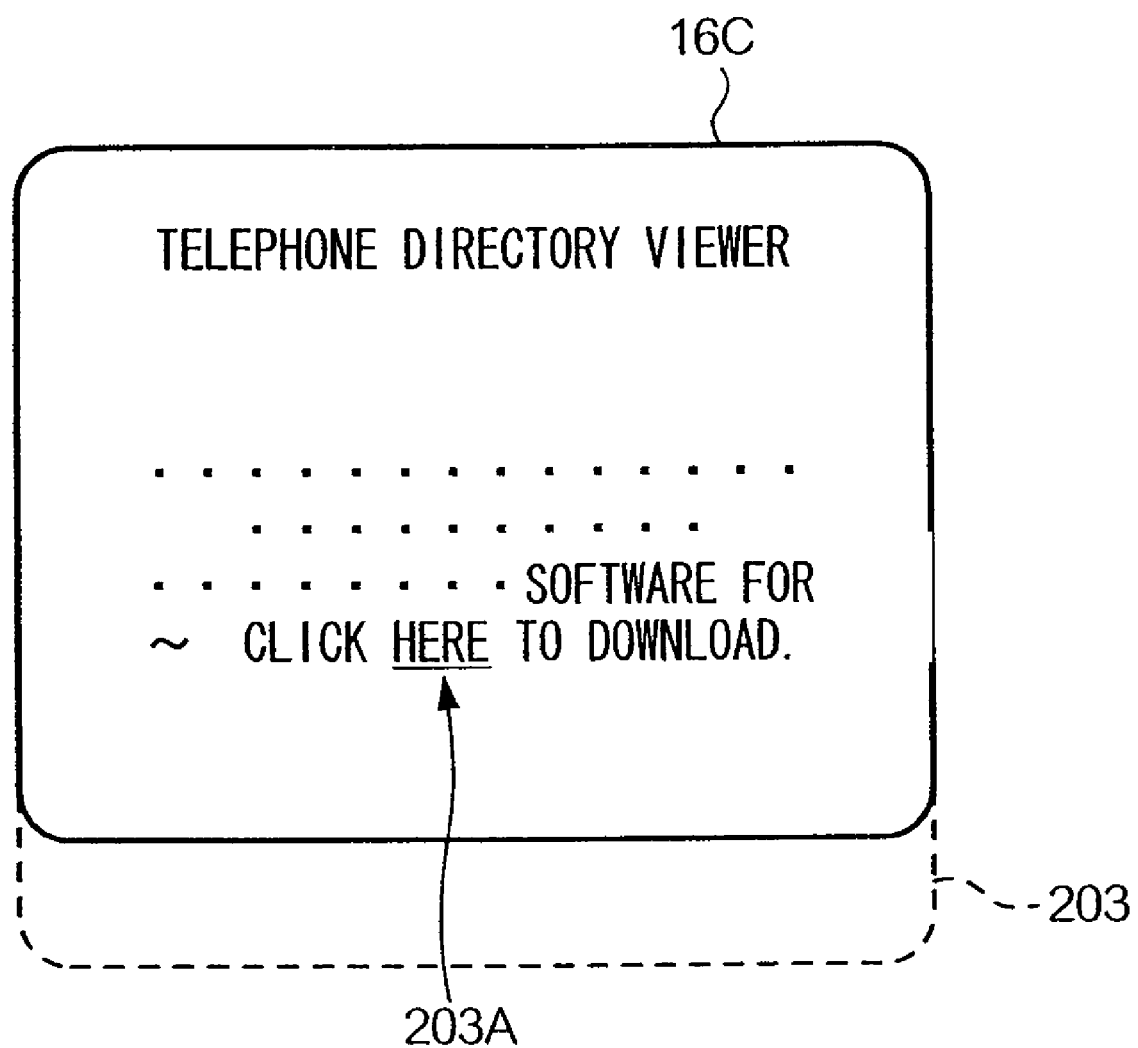
FIG. 15 is a diagram showing an explanatory page transmitted in the transmission system.

As shown in FIG. 18, in the operation which begins by trying to obtain list file 200, an operation identical to the operation shown in FIG. 17 is carried out till list page 201 shown, for instance, in FIG. 9 is displayed after mobile unit 16 receives response message tm 21. When the user, after seeing list page 201, operates mobile unit 16 to hit option 201A in list page 201, request message tm 32 containing URL corresponding to option 201A ("http://www.main.bbb.co.jp/ghi.html") as a parameter of the GET method is produced in mobile unit 16. Request message tm 32 is transmitted by mobile unit 16, and is received by IP server unit 13. In IP server unit 13, response message tm 33 containing explanatory file 202 in response to the content of request message tm 32 is produced. Response message tm 33 is transmitted by IP server unit 13, and is received by mobile unit 16. In mobile unit 16, the user is provided with UI corresponding to the content of explanatory file 202. As a result, in displaying unit 16C, explanatory page 203 shown, for instance, in FIG. 15 is displayed.

When the user, after seeing explanatory page 203, operates mobile unit 16 to hit anchor 203A in explanatory page 203, the value specified as ijam property of the anchor tag written in explanatory file 202 in FIG. 14 (the tag which begins with "<A") identifies the object tag specified as id property (the tag which begins by "<OBJECT"). Then, URL specified as data property of the object tag ("http://www.aaa.co.jp/abc.sdf") is extracted, and determination of Step S11 in FIG. 5 is carried out. In the example, the extension of URL is sdf; therefore, the process of step S13 and thereafter is carried out. In other words, the process is carried out as follows. First, request message tm 34 requesting transmission of SDF 204 identified by the URL is produced. Request message tm 34 is transmitted by mobile unit 16, and is received by administering server unit 18. In administering server unit 18, response message tm 35 containing SDF 204 in response to the content of request message tm 34 is produced. Response message tm 35 is transmitted by administering server unit 18, and received by mobile unit 16 via gateway server unit 17 and mobile packet communication network 15. The communication path between administering server unit 18 and gateway server 17 is an exclusive line, and since gateway server unit 17 is directly connected to mobile packet communication network 15 whose security is assured, SDF 204 can not be falsified until SDF 204 is received by mobile unit 16 (thereinbefore, Step S13).

In mobile unit 16, SDF 204 is written into fixed memory 16D1 of fixed memory 16D. Also, in mobile unit 16, APID ("0001"), ADF-URL ("http://www.main.bbb.co.jp/viewer.jam"), and the public key are extracted from SDF 204, and request message tm 36 requesting transmission of ADF 205 identified by ADF-URL is produced. Request message tm 36 is transmitted by mobile unit 16, and is received by IP server unit 13. In IP server unit 13, response message tm 37 containing ADF 205 in response to the content of request message tm 36 is produced. Response message tm 37 is transmitted by IP server unit 13, and is received by mobile unit 16 (thereinbefore, Step S14).

In mobile unit 16, authenticity of ADF 205 is determined by using the public key extracted from SDF 204 (Step S15). As mentioned above, since the public key contained in SDF 204 corresponds to the key used for the signature on ADF 205, ADF 205 is determined to be authentic as far as ADF 205 is not changed in IP server unit 13, or on the communication path between IP server unit 13 and mobile unit 16.

When ADF 205 is determined to be authentic, in mobile unit 16, APID extracted from SDF 204 and APID contained in ADF 205 are compared (Step S16). As mentioned above, since APID which matches APID in SDF 204 is written in ADF 205 in IP server unit 13, APID extracted from SDF 204 and APID contained in ADF 205 match as long as the description is correct.

When APID match, in mobile unit 16, whether the third Java-AP software can be installed is determined on the basis of the content of ADF 205 (Step S17). As mentioned above, since mobile unit 16 is in the status in which the third Java-AP software can be installed, the third Java-AP software is determined to be installable in mobile unit 16.

Then, in mobile unit 16, ADF 205 is written into fixed memory 16D1. Also, in mobile unit 16, the hash value and package URL ("http://www.main.bbb.co.jp/viewer.jar") are extracted, and request message tm 38 requesting transmission of Jar file 206 identified by the package URL is produced. Request message tm 38 is transmitted by mobile unit 16, and is received by IP server unit 13. In IP server unit 13, response message tm 39 containing Jar file 206 corresponding to the content of request message tm 38 is produced. Response message tm 39 is transmitted by IP server unit 13, and is received by mobile unit 16 (thereinbefore, Step S18).

In mobile unit 16, the hash value is calculated by using Jar file 206 and the specific hash function (Step S19), and the calculated hash value and the hash value extracted from ADF 205 are compared (Step S20). As mentioned above, the hash value of the Jar file corresponding to ADF 205 is written in ADF 205; therefore, these hash values would match as long as the description is correct. When these hash values match, in mobile unit 16, Jar file 206 is written into fixed memory 16D1, and the installation of the third Java-AP software is completed (Step S21 and S22).

When ADF 205 is determined to be not authentic in mobile unit 16, when APID extracted from SDF 204 and APID contained in ADF 205 do not match, when the third Java-AP software is determined to be not installable, or when the calculated hash value and the hash value extracted from ADF 205 do not match, a failure notice is sent to the user (Step S23), and the status of mobile unit 16 returns to a previous status that which existed before the acquisition of SDF 204 began.

(2-2) Operation of Mobile Unit 16 when Java-AP Software is Activated

Next, the operation of mobile unit 16 when Java-AP software is activated will be explained.

(2-2-1) First Java-AP Software

The operation of mobile unit 16, when the first Java-AP software installed by the above-mentioned installation operation is activated in mobile unit 16 in which JAM is achieved, and the functions corresponding to the software (hereinafter, referred to as the first Java-AP) are achieved will be explained.

When API, which the first Java-AP is about to use is non-trusted API, the use of the API is approved by JAM. Hence, the first Java-AP can use the API.

On the other hand, when API, which the first Java-AP is about to use is trusted API, JAM checks whether SDF corresponding to the Java-AP is stored in fixed memory 16D. Since such SDF is not stored in fixed memory 16D, JAM forbids the use of the API by the first Java-AP. Hence, the first Java-AP will not be able use the API.

(2-2-2) Second Java-AP Software

The operation of mobile unit 16 when the installed second Java-AP software is activated in mobile unit 16 in which JAM is achieved, and the functions corresponding to the software are achieved, is identical to the operation of mobile unit 16 when the first Java-AP software is activated.

(2-2-3) Third Java-AP Software

The operation of mobile unit 16 when the installed third Java-AP software is activated in mobile unit 16 in which JAM is achieved, and the functions corresponding to the software (hereinafter, referred to as the third Java-AP) are achieved, will be explained.

When API, which the third Java-AP is about to use is non-trusted API, the use of the API is approved by JAM. Hence, the third Java-AP can use the API.

When API, which the third Java-AP is about to use is trusted API, the operation of mobile unit 16 depends upon the API. Hereinafter, the operation of mobile unit 16 is explained with regard to each API.

(2-2-3-1) getPhoneList( )

Since "getPhoneList( )" is trusted API, whether the API can be used is determined by JAM on the basis of policy information in SDF 204 stored in fixed memory 16D. The content of the policy information is the content shown in FIG. 7; therefore, the use of "getPhoneList( )" is approved by JAM. Hence, the third Java-AP can use "getPhoneList( )". In other words, the third Java-AP can read out telephone number directory data.

(2-2-3-2) getCallHistory( )

Since "getCallHistory( )" is trusted API, whether the API can be used is determined by JAM on the basis of policy information in SDF 204. Since the content of the policy information is the content shown in FIG. 7, the use of "getCallHistory( )" is forbidden by JAM. Hence, the third Java-AP cannot use "getCallHistory( )". In other words, the third Java-AP cannot read out history data of transmission and reception.

(2-3) Operation after Third Java-AP Software is Changed

Next, the operation of the present system after IP, which administers IP server unit 13 and IP server unit 14 changes the transmission mode or the content of the third Java-AP software will be explained. However, the present change includes the change of the content of Jar file 206 for the purpose such as the improvement of the third Java-AP software, and the change of the transmission mode for the purpose such as alleviating the burden on IP server unit 13. To achieve the latter change, IP which administers IP server unit 13 and IP server unit 14, as shown in FIG. 19, stores Jar file 206 after the change (hereinafter, referred to as Jar file 215) in fixed memory 14A of IP server unit 14, and produces ADF 216 by changing the content of ADF 205 in accordance with Jar file 215. The above-mentioned operation is required for transmission of the third Java-AP software after the change, and no operation is required for the communication provider, which administers administering server unit 18.

The installation operation of the third Java-AP software after such changes is shown in FIG. 20. The operation shown in FIG. 20 begins to differ from the operation shown in FIG. 18 when, in IP server unit 13, response message tm 47 containing ADF 216 is produced as opposed to response message tm 37 containing ADF 205. Response message tm 47 corresponds to response message tm 37, response message tm 48 corresponds to response message tm 38, and response message tm 49 corresponds to response message tm 39.

The operation after response message tm 47 is produced in IP server unit 13 essentially differs from the operation shown in FIG. 18 in that ADF 216 and Jar file 215 are the objects of the process; request message tm 48 requesting transmission of Jar file 215 identified by package URL contained in ADF 216 ("http://www.sub.bbb.co.jp/viewer.jar") is produced in mobile unit 16; request message tm 48 is transmitted by mobile unit 16, and received by IP server unit 14; response message tm 49 containing Jar file 215 is produced in IP server unit 14; and response message tm 49 is transmitted by IP server unit 14, and is received by mobile unit 16.

(3) Modification

In the above-mentioned transmission system, ADF and a Jar file are transmitted by the IP server unit, but one or both of these can be transmitted by the administering server unit.

Also, in the above-mentioned transmission system, the mobile unit confirms the authenticity of the correspondence of the producer of SDF with the producer of ADF on the basis of signature data using the secret key and the public key, but the length of the process in the mobile unit and the IP server unit, or the amount of communication among the mobile unit, the administering server unit, and the IP server unit can be alleviated by not including the public key in SDF; by not signing ADF by using the secret key in the IP server unit; or by omitting the confirmation process in the mobile unit, according to the security level required for the system.

Also, in the above-mentioned transmission system, the hash value of the Jar file is included in ADF corresponding to the Jar file; and the hash value is calculated in the mobile unit; then the authenticity of the correspondence of the Jar file and ADF is confirmed by comparing the hash value in ADF to the calculated hash value, but the length of the process in the mobile unit and the IP server unit and the amount of communication between the mobile unit and the IP server unit can be alleviated by omitting the confirmation process without including the hash value in ADF depending upon the security level required for the system.

Also, in the above-mentioned transmission system, whether the correspondence of SDF with ADF (and the Jar file) is authentic is determined by using the inherent APID to trusted Java-AP, but authenticity of the correspondence of SDF with ADF (and the Jar file) can be determined by using the CID inherent to the information provider, which provides trusted Java-AP. Also, depending upon the security level required for the system, the determination made on the basis of APID and CID can be omitted.

Also, in the above-mentioned transmission system, the server is specified by using the domain name, but the server can also be specified by using the IP address.

Also, in the mobile unit, by comparing the domain name of the server unit, which transmits SDF to a preset letter string, SDF can be determined to be authentic only when the domain name is that of a server unit administered by a trustworthy organization. In this mode, the letter string to be compared (for instance, the letter string showing the domain name of the communication provider) is pre-stored in ROM or the fixed memory of the mobile unit. When the letter string is pre-stored in ROM, higher security can be assured since the letter string cannot be rewritten. Also, if the letter string is pre-stored in the fixed memory, trustworthy organizations can be stored after the purchase of the mobile unit; therefore, excellent convenience can be provided to a user and a trustworthy organization.

Also, in the above-mentioned transmission system, a high level of security is assured with a communication provider, which provides the communication path used for transmission of SDF as a trustworthy organization, but the technological scope of the present invention includes the mode in which the communication path is not provided by a trustworthy organization. For instance, by connecting a trustworthy organization to a mobile unit by using an encrypted communication path, the trustworthy organization can transmit SDF via the encrypted communication path. Also, even if the security of the communication path is not assured, by transmitting after encrypting SDF, and decoding SDF in the mobile unit, SDF can be transmitted with a certain degree of security.

In the above-mentioned transmission system, a file is transmitted and received in accordance with HTTP, but the system can be modified to assure higher security by using HTTPS.

Also, in the above-mentioned transmission system, a trustworthy organization can be an IP, in other words, the administering unit could comprise an IP server unit.

Moreover, in the above-mentioned transmission system, API is the object for restricting the use by Java-AP, but any resource can be the object. The resource can be a hardware resource. Also, the resource can be a network resource, or a software resource. A hardware resource can be a resource such as a memory, a speaker, a microphone, an infrared controller, LED (Light Emitting Diode) which a mobile unit can be equipped with, or an external hardware box such as UIM (User Identity Module) or SIM (Subscriber Identity Module) which functions with the mobile unit.

Next, a network resource is explained. As mentioned above, the mobile unit performs radio communication with the mobile communication network. During radio communication, the mobile unit uses a radio resource such as a radio channel provided by the mobile communication network. The radio resource is one of network resources. Also, the mobile unit, in a higher communication protocol layer than the communication protocol layer the radio resource belongs to, uses a communication resource such as a transmission path of packets or a communication path of the connecting network. The communication resources such as these are included as a network resource.

Next, a software resource is explained. A software resource can be API, a class, a package and so forth. Various functions are provided by a software resource, but a typical function can be a computation process such as encryption computation, or a function of transmitting or receiving data with other applications such as a Web browser. Also, the technological scope of the present invention includes the mode of restricting the use of a software resource, which the above-mentioned external hardware box is equipped with.

Incidentally, the use of a hardware resource or a network resource by Java-AP generally takes place by using a software resource. A mobile unit of the above-mentioned transmission system is also equipped with a software resource to use a hardware resource or a network resource, and by restricting the use of a software resource of this type; the use of a hardware resource or a network resource is indirectly restricted. By indirectly restricting in this manner, and by preparing various software resources, restrictions which cannot be achieved unless restriction on a plurality of resources are changed in detail, such as giving the right to change the authorization of Java-AP to only trusted Java-AP, lifting the restriction on allowing to communicate only with a server unit accessed for downloading, or allowing to access a specific memory domain can easily be specified. Also, the mode of indirectly restricting the use of a software resource of the above-mentioned external hardware box by restricting the use of a software resource installed in the mobile unit is included in the technological scope of the present invention.

With regard to a method of expressing permission, a flag (permit/forbid) corresponding to one resource can be used, or permissions of a plurality of resources can be denoted by one expression.

Also, in the present invention, permission can be denoted to permit (or forbid) the use of a resource with a plurality of types. In this case, in the mobile unit, a more precise control can be achieved. For instance, since two modes (reading out and writing in) exist in the memory, the memory can be used for both reading out and writing in by trusted Java-AP although memory is used only for reading out by non-trusted Java-AP. Also, for instance, when the Web browser and so forth are activated while Java-AP with the right to use a packet transmission path is activated in a mobile unit in which a plurality of applications can share one packet transmission path, control can be such that Java-AP which is permitted to "exclusively use a packet transmission path" can exclusively use a packet transmission path although the Java-AP which is not permitted to "exclusively use a packet transmission path" cannot exclude the sharing of packet transmission path by a Web browser and so forth. Also, by further modifying the above-mentioned modification, the following control can be possible. In other words, Java-AP with a certain type of permission can exclusively use the packet communication path without the user's consent. Also, Java-AP with another permission can use the packet communication path without the user's consent, but needs to obtain the user's consent to exclusively use the packet communication path. Also, Java-AP with another permission can use the packet communication path without the user's consent, but cannot exclusively use the packet communication path. Also, Java-AP with another permission can use the packet communication path only with the user's permission. Also, Java-AP with another permission cannot even use the packet communication path. As it is obvious from these examples, "types of use" of the present invention also contain types of a process when a resource is used (a process of obtaining the user's consent/a process of not obtaining the user's consent)

Also, in the above-mentioned transmission system, an identical list page is provided for all mobile units, but a different list page can be provided for each mobile unit.

Also, in the above-mentioned transmission system, the operation of Java-AP is restricted when the Java-AP is executed. Instead, by including policy information in the Jar file stored in the IP server unit, and when the Jar file is downloaded in the mobile unit, activation of the Java-AP corresponding to the Jar file, or installation of Java-AP software containing the Jar file can be forbidden if comparison between the policy information and the policy information in SDF results in a mismatch. Only the permission given to the item as a result of the match in policy information can be valid.

Also, SDF can be transmitted after being signed by the secret key, which CA gives to the communication provider, and the signature on SDF can be inspected in the mobile unit by the public key, which CA gives to the communication provider. The public key of the communication provider must necessarily be pre-stored in the mobile unit. The public key can be pre-stored in the fixed memory after being transmitted by means of communication. Also, the mobile unit can be sold after writing the key into ROM.

Also, in the above-mentioned transmission system, software is delivered to a mobile unit, but the technological scope of the present invention includes the mode of transmitting software to a terminal unit besides a mobile unit.

The invention claimed is:

1. A communication method in a communication system, comprising:

providing a terminal unit, an information providing server unit, and an administering server unit, the information providing server storing an entity file including a program executed by the terminal unit, the administering server unit storing a security descriptive file including authorization information and first location information, the authorization information being used to control access by the program to at least one of a hardware resource, a network resource, and a software resource, the first location information including storage location information indicative of a storage location of the entity file;

transmitting, by the administering server unit, the security descriptive file to the terminal unit;

transmitting, by the information providing server, the entity file to the terminal unit in response to a request for the entity file sent from the terminal unit after receipt of the security descriptive file at the terminal unit, the storage location of the entity file being identified based on the first location information included in the security descriptive file; and controlling, when the terminal unit executes the program included in the entity file, access to the at least one resource on the basis of the authorization information included in the security descriptive file.

2. The communication method according to claim 1, wherein the administering server stores an application descriptive file including second location information, the second location information showing the storage location of the entity file, the first location information showing a storage location of the application descriptive file, and the communication method further comprises, transmitting, by the administering server, the application descriptive file to the terminal unit in response to a request for the application descriptive file the storage location of the application descriptive file being shown by the first location information stored in the security descriptive file, and transmitting, by the terminal unit, the request for the entity file after receiving at the terminal unit the application descriptive file, the storage location of the entity file being shown by the second location information included in the application descriptive file.

3. The communication method according to claim 2, wherein the application descriptive file is signed using a secret key, the secret key being given to an information provider providing the application, the security descriptive file includes a public key of the information provider, the public key being provided by a certifying agent, the communication method further comprises verifying, by the terminal unit, authenticity of the application descriptive file by using the public key, and the terminal unit transmits the request for the entity file if the authenticity of the application descriptive file is verified.

4. The communication method according to claim 2, wherein the application descriptive file and the security descriptive file include an application identifier, the application identifier being given by an administrator that administers the administering server unit, the communication method further comprises comparing, by the terminal unit, the application identifier included in the received security descriptive file with the application identifier included in the received application descriptive file, and the terminal unit obtains the entity file if the application identifier included in the received security descriptive file is consistent with the application identifier included in the received application descriptive file.

5. The communication method according to claim 1, wherein the administering server transmits the security descriptive file via a secured communication path.

6. The communication method according to claim 5, wherein the secured communication path includes at least one of a mobile communication network and an encrypted communication path.

7. The communication method according to claim 1, wherein the communication method further comprises encrypting, by the communication system, the security descriptive file, the administering server transmits the encrypted security descriptive file to the terminal unit, the communication method further comprises decrypting, by the terminal unit, the encrypted security descriptive file transmitted from the administering server, and the terminal unit transmits the request for the entity file on the basis of the decrypted security descriptive file.

8. The communication method according to claim 1, wherein the software resource includes at least one of an API (Application Program Interface), a class, and a package.

9. The communication method according to claim 1, wherein the authorization information shows a type of use of a resource.

10. The communication method according to claim 1, wherein the information providing server unit stores a downloadable file including third location information, the third location information showing a storage location of the security descriptive file, and the communication method further comprises transmitting the downloadable file from the information providing server unit to the terminal unit, and transmitting, by the terminal unit, a request for the security descriptive file by using the received downloadable file, and the administering server unit transmits to the terminal unit the security descriptive file requested by the terminal unit.

11. The communication method according to claim 1, wherein the entity file is transmitted to the terminal unit only if the storage location of the security descriptive file is within the administering server unit.

12. A communication method in a communication system comprising:

providing an information providing server unit, and an administering server unit, the information providing server storing an entity file including a program executed by a terminal unit, the administering server unit storing a security descriptive file including authorization information and location information, the authorization information being used to control access by the program to at least one of a hardware resource, a network resource, and a software resource, the location information including storage location information indicative of a storage location of the entity file;

transmitting, by the administering server unit, the security descriptive file to the terminal unit; and transmitting, by the information providing server, the entity file to the terminal unit in response to a request for the entity file from the terminal unit after receipt of the security descriptive file at the terminal unit, the stored location of the entity file being identified based on the location information included in the security descriptive file.

13. A communication system comprising:

a terminal unit, an information providing server unit, and an administering server unit, the information providing server storing an entity file including a program executed by the terminal unit, the administering server unit storing a security descriptive file including authorization information and location information, the authorization information being used to control access by the program to at least one of a hardware resource, a network resource, and a software resource, the location information including storage location information indicative of a storage location of the entity file, the communication system further comprising:

a transmitting unit in the administering server unit, configured to transmit the security descriptive file to the terminal unit;

a transmitting unit in the information providing server, configured to transmit the entity file to the terminal unit in response to a request for the entity file from the terminal unit after receipt of the security descriptive file at the terminal unit, the storage location of the entity file being identified based on the location information included in the security descriptive file; and a controlling unit in the terminal unit, configured to control, when the terminal unit executes the program included in the entity file, access to the at least one resource on the basis of the authorization information included in the security descriptive file.

* * * * *